US012683300B2

(12) United States Patent
Jin

(10) Patent No.: US 12,683,300 B2
(45) Date of Patent: Jul. 14, 2026

(54) SINGLE PAIR ETHERNET CONNECTION SYSTEM

(71) Applicant: KYOCERA AVX Components Corporation, Fountain Inn, SC (US)

(72) Inventor: Xin Jin, Fountain Inn, SC (US)

(73) Assignee: KYOCERA AVX COMPONENTS CORPORATION, Fountain Inn, SC (US)

( * ) Notice: Subject to any disclaimer, the term of this patent is extended or adjusted under 35 U.S.C. 154(b) by 559 days.

(21) Appl. No.: 18/095,368

(22) Filed: Jan. 10, 2023

(65) Prior Publication Data

US 2023/0253720 A1 Aug. 10, 2023

(30) Foreign Application Priority Data

Feb. 9, 2022 (WO) ................ PCT/CN2022/075721

(51) Int. Cl.

| | |
|---|---|
| ***H01R 4/2429*** | (2018.01) |
| ***H01R 24/64*** | (2011.01) |
| ***H01R 43/01*** | (2006.01) |
| ***H01R 103/00*** | (2006.01) |

(52) U.S. Cl.

CPC ........... *H01R 4/2429* (2013.01); *H01R 24/64* (2013.01); *H01R 43/01* (2013.01); *H01R 2103/00* (2013.01)

(58) Field of Classification Search

CPC ...... H01R 4/2429; H01R 24/64; H01R 43/01; H01R 2103/00

USPC .......................................................... 439/404

See application file for complete search history.

(56) References Cited

U.S. PATENT DOCUMENTS

| | | | | |
|---|---|---|---|---|
| 5,122,078 A * | 6/1992 | Davis | H01R 12/675 439/751 |
| 5,549,488 A * | 8/1996 | Berndt | H01R 25/162 439/701 |
| 5,603,634 A | 2/1997 | Ichikawa et al. | |
| 6,050,845 A | 4/2000 | Smalley et al. | |

(Continued)

FOREIGN PATENT DOCUMENTS

| | | |
|---|---|---|
| GB | 2 293 696 A | 4/1996 |
| JP | H08-148203 | 6/1996 |

(Continued)

OTHER PUBLICATIONS

International Search Report and Written Opinion in PCT/CN2022/075721 dated Oct. 31, 2022.

*Primary Examiner* — Gary F Paumen
(74) *Attorney, Agent, or Firm* — Foley & Lardner LLP

(57) ABSTRACT

This disclosure provides a method and apparatus for a single pair Ethernet (SPE) wire-to-board connector. The SPE connector may include a female connector portion and a male connector portion. The female connector portion may include a first electrical contact having a first contact tine and a first receiving portion, a second electrical contact having a second contact tine and a second receiving portion. The male connector portion includes a third electrical contact comprising a first insulation displacement contact (IDC) portion and a third contact tine, a fourth electrical contact comprising a second DC portion and a fourth male portion, and a second inner housing having a first wire retention groove, a second wire retention groove, and an opening structured to allow an SPE cable to extend therethrough.

20 Claims, 15 Drawing Sheets

(56) References Cited

U.S. PATENT DOCUMENTS

| | | | | | |
|---|---|---|---|---|---|
| 6,059,601 | A * | 5/2000 | Hirai | H01R 43/20 | |
| | | | | 29/874 | |
| 6,890,210 | B2 * | 5/2005 | Lee | H01R 4/2454 | |
| | | | | 439/417 | |
| 2004/0185703 | A1 | 9/2004 | Lee | | |

FOREIGN PATENT DOCUMENTS

| | | |
|---|---|---|
| JP | 2001-198086 | 7/2001 |
| JP | 2017-523569 | 8/2017 |

* cited by examiner

SINGLE PAIR ETHERNET CONNECTION SYSTEM

CROSS-REFERENCE TO RELATED APPLICATIONS

The present application claims priority to PCT Application No. PCT/CN2022/075721, filed Feb. 9, 2022, the entire contents of which are incorporated by reference herein.

FIELD

The present application relates generally to the field of electrical connectors, and more particularly to a single pair Ethernet (SPE) connection system.

BACKGROUND

The following description is provided to assist the understanding of the reader. None of the information provided or references cited are admitted to be prior art.

Various types of connectors are used for forming connections between a wire and any manner of electronic or electrical component. For example, an electrical connection may be formed between a printed circuit board (PCB) of a controller and a sensor assembly. Traditionally, the electrical connection between a wire and (PCB) is formed by soldering the core of the wire onto an electrical pad or of the PCB. The wire may similarly be soldered to an electrical pad of the sensor assembly to form the electrical connection between the sensor assembly and the controller. This process can be tedious, inefficient, and undesirable and may result in a high scrap rate, which may be expensive. Moreover, once a solder has been made, the connection is not reparable, and a replacement would require new components. This is undesirable in applications where components cannot be easily reachable (e.g., a connection to a vehicle's PCB). Thus, a quick, efficient, and reliable device that can be used to connect two or more devices together for communication and/or power sharing therebetween is desirable.

SUMMARY

The systems, methods, and devices of this disclosure each have several innovative aspects, no single one of which is solely responsible for the desirable attributes disclosed herein.

A single pair Ethernet (SPE) connector is disclosed. In one implementation, the SPE connector includes a female connector portion and a male connector portion. The female connector portion may include a first electrical contact having a first contact time and a first receiving portion, a second electrical contact having a second contact tine and a second receiving portion. The male connector portion includes a third electrical contact comprising a first insulation displacement contact (IDC) portion and a third contact tine, a fourth electrical contact comprising a second IDC portion and a fourth male portion, and a second inner housing having a first wire retention groove, a second wire retention groove, and an opening structured to allow an SPE cable to extend therethrough.

In another implementation, the SPE connector includes a female connector portion and a male connector portion structured to be selectively couplable. The female connector portion includes a first contact having a first contact tine, a second contact having a second contact tine, and a first insulative housing having a first contact retention recess and a second contact retention recess. In an embodiment, the first contact is positioned at least partially within the first contact retention recess, and the second contact is positioned at least partially within the second contact retention recess. In some embodiments, the first contact tine and the second contact tine extend from the first insulative housing and are configured to electrically and mechanically connect to respective openings of an electrical component. The male connector portion includes a first insulation displacement contact (IDC), a second IDC contact, and a second inner housing having a first slot intersecting with a first wire retention groove and structured to receive blades from the first IDC contact and a second slot intersecting with a second wire retention groove structured to receive blades from the second IDC contact.

Another implementation relates to a method of assembly. The method may include extending an SPE cable through a second inner housing, positioning a first wire of the SPE cable within a first wire retention groove of the second inner housing and a second wire of the SPE cable within a second wire retention groove of the second inner housing, compressing a first housing onto the second inner housing such that a first electrical connection is made between the first wire and a first IDC contact and a second electrical connection is made between the second wire and a second IDC, adjoining an outer housing and a pressure nut together over the first housing and the second inner housing such that the first housing and the second inner housing are mechanically secured within the outer housing and the pressure nut, and adjoining the outer housing to a female connector such that the first IDC contact mechanically and electrically connects to a first female contact and the second IDC contact mechanically and electrically connects to a second female contact.

The electrical connector is not limited by its number of wire openings or other components. Particular embodiments of electrical connectors are described in greater detail below by reference to the examples illustrated in the various drawings.

DETAILED DESCRIPTION

Figure 1:
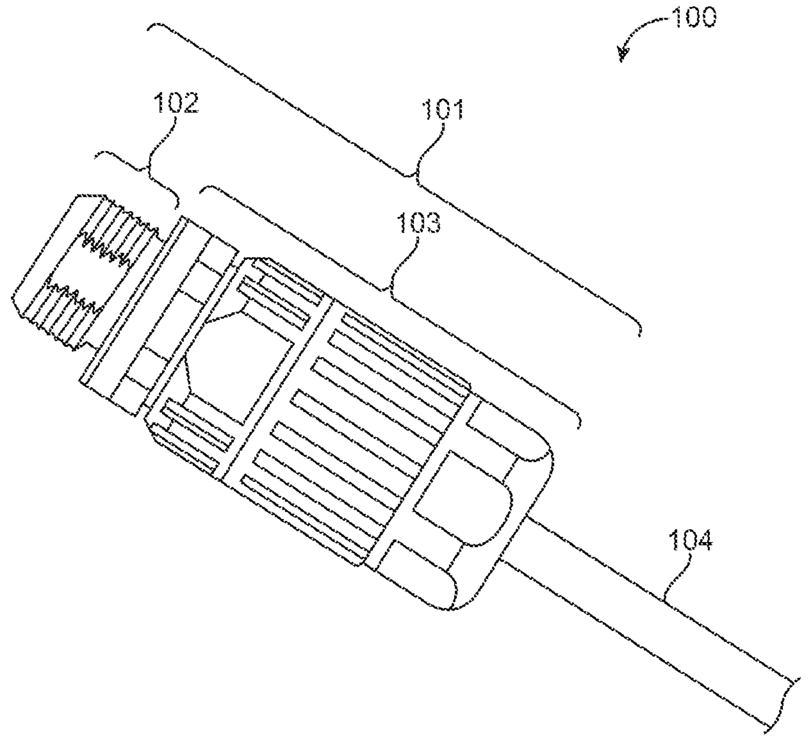
FIG. 1 is an isometric view of a single pair Ethernet (SPE) connector in accordance with an illustrative embodiment.

Reference will now be made to various embodiments, one or more examples of which are illustrated in the figures. The embodiments are provided by way of explanation of the invention and are not meant as a limitation of the invention. For example, features illustrated or described as part of one embodiment may be used with another embodiment to yield still a further embodiment. It is intended that the present application encompass these and other modifications and variations as come within the scope and spirit of the invention.

Disclosed herein is a single pair Ethernet (SPE) connector. In various embodiments, the SPE connector is circular in that various components have a circular shaped outer housing. The circular connector allows for a secure mechanical connections to be formed via threadings as described herein. The SPE connector can be used with a variety of corresponding connectors and electrical components. For example, the SPE connector may be used with a corresponding electrical component such as a printed circuit board (PCB) and/or an electrical plug. In an embodiment, the SPE connector includes a male connector portion and a female connector portion. The female connector is configured to connect to an electrical plug via an electrical connection between contact tines of respective electrical contacts and the male connector is configured to connect to the two wires of an SPE cable via an insulation displacement end of respective electrical contacts. In various embodiments, the SPE cable may include any type of wire or cable, for example, having two conductive elements. The female connector and the male connector are configured to mate together such that a first electrical connection between a first contact of the electrical component and a first wire of the SPE cable is formed and a second electrical connection between a second contact of the electrical component and a second wire of the SPE cable is formed.

The unique design of the male connector and the female connector increases the versatility of the SPE connector. For example, the male connector allows for an easy disconnection and reconnection of SPE cables to the female end and the IDC contact portions of the male connector allow for a user to efficiently and reliably make connections between the male connector and wires of the SPE (or other) cable. Moreover, the unique design of the female connector allows for a quick and reliable connection to a male connector via allowing an outer housing to freely rotate about and inner housing. Accordingly, this versatility allows for a wide potential of options of connecting, reconnecting, replacing, and/or adding connections between devices. For example, traditionally, a user must manually handle each wire and solder the wire to a contact pad of the PCB, the PCB must be pre-fabricated to accept a particular plug or socket, and/or the SPE cable must be stripped and connected and secured to a corresponding plug or socket. However, the design for this SPE connector allows for an SPE cable to be connected and/or disconnected to an electrical component such as a PCB efficiently and reliably, which allows for versatility in, for example, a multifaceted application such as an industrial application where updates, changes, and inclusion of devices within a system are ever changing. In addition, the design of the SPE ensures a reliable electrical connection between PCB (or other electrical component) and wires (e.g., via the prongs of the inner housing that provide additional mechanical support) that are resistant to thermal changes and/or vibrations that could cause a soldered electrical connection to crack, rust, and/or break. Such a design is advantageous in, for example, particular applications such as in vehicles where there are fluctuations in temperature and mechanical vibrations are present.

Moreover, and in particular, for communications connections such as Ethernet, the SPE connector allows for a single pair of conductive wires to transmit data while simultaneously delivering power between devices. The shielding components (e.g., of the outer female housing and the outer male housings) of the SPE connector ensure data communication integrity by reducing potential electromagnetic interference.

Various embodiments of an SPE connector and various corresponding electrical components are illustrated throughout FIGS. 1 through 10. The SPE connector disclosed in these figures is configured to assist in the electrical and mechanical connection of multiple wires to a corresponding electrical component. In an embodiment, the SPE connector may have additional electrical contacts. It should be appreciated that the SPE connectors disclosed herein are not limited by a maximum number of wire positions, corresponding electrical contacts, press-fit pins, or types of connections that couple each component together.

FIG. 1 is an isometric view 100 of a single pair Ethernet (SPE) connector 101 connected to an SPE cable 104 in accordance with an illustrative embodiment. The SPE connector 101 includes a female connector 102 and a male connector 103 mated together. In particular, the SPE cable 104 is mechanically connected to the male connector 103 and the male connector 103 is mechanically connected to the female connector 102.

In some embodiments, the male connector 103 and the female connector 102 may be mechanically secured together via a latching mechanism. In various embodiments, the latching mechanism may include a lock-and-pin configuration, a threaded configuration, and/or other types of mechanical connections. The male connector 103 is connected to the SPE cable 104 via a mechanical force. In various embodiments, the mechanical force may include a frictional fit, a compression force, or a combination thereof. The latching mechanism and the mechanical force ensure that the SPE connector 101, once assembled, reliably maintains the electrical connections formed by the SPE connector 101.

The female connector 102 is further structured to mechanically and electrically connect to a corresponding electronic device. In various embodiments, the corresponding electronic device may include a printed circuit board (PCB), a corresponding connector, or any other type of electronic device that may implement single-pair Ethernet. In one example, the female connector 102 includes two contacts, each protruding from a bottom edge of the female connector 102. Moreover, the female connector 102 may include one or more prongs extending from the bottom edge of the female connector 102 parallel to the two contacts. In this example, the two contacts may be inserted into respective conductive through-holes on a PCB. In various embodiments, the two contacts may include press-fit pins or otherwise structured to be mechanically and electrically connected to the respective conductive through-holes, for example, via soldering. The one or more prongs may be inserted into respective openings on the PCB and provide mechanical support to the SPE connector 101. In some embodiments, the one or more prongs may be structured to mechanically secure the SPE connector 101 to the respective electronic device, for example, via a mechanical latching mechanism. In this way, the reliability of electrical connections made via the SPE connector 101 is ensured due to the rigid structure of the male connector 103 and the female connector 102.

Figure 2:
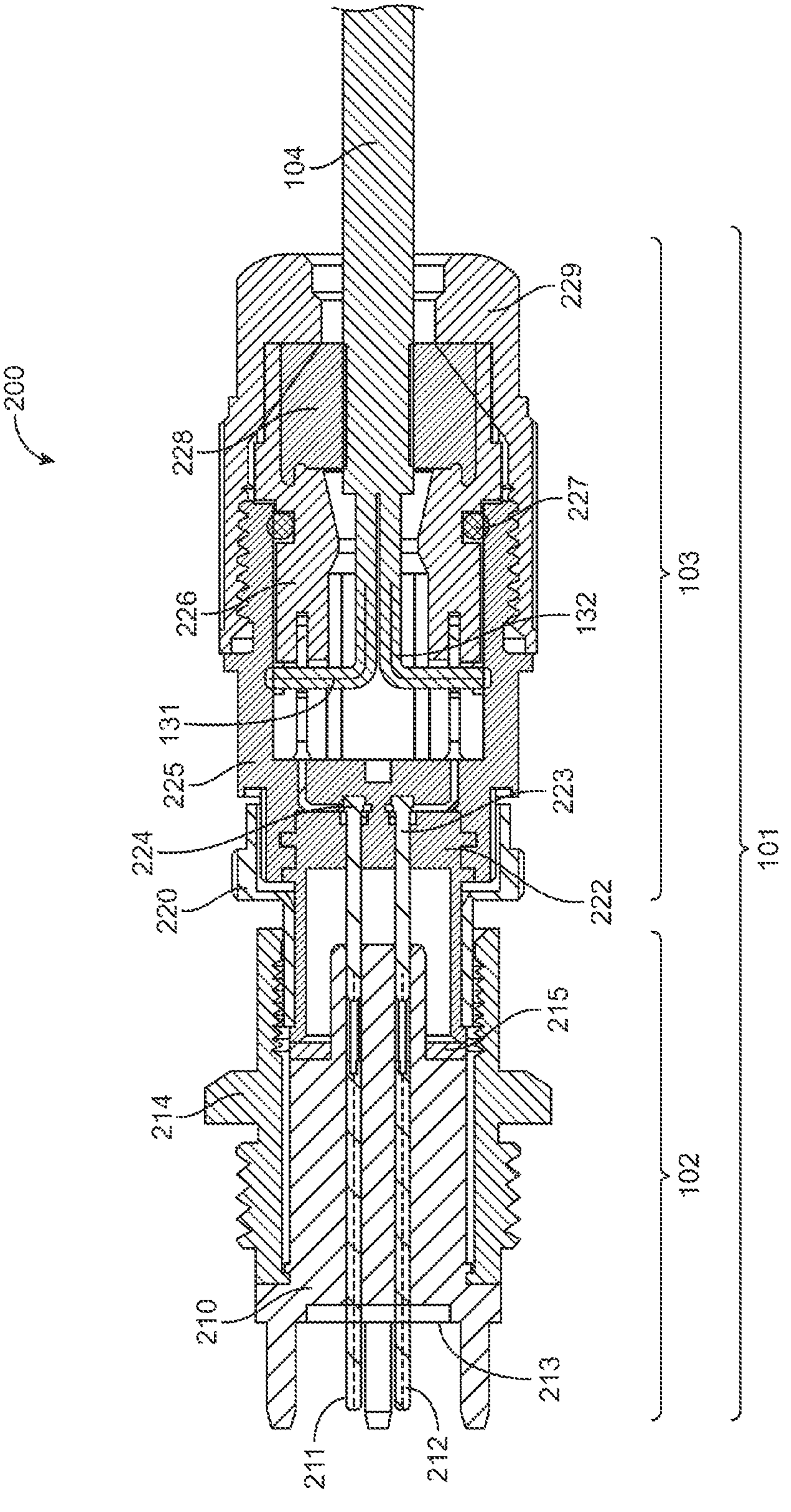
FIG. 2 is a cross-sectional view of the SPE connector in accordance with an illustrative embodiment.

FIG. 2 is a cross-sectional view 200 of the SPE connector 101 in accordance with an illustrative embodiment. The SPE connector 101 includes the male connector 103 and the female connector 102. The cross-sectional view 200 of the SPE connector 101 depicts the electrical connection between a conductive element of a first wire 131 of the SPE cable 104 and a first female contact 211 of the female connector 102 via an electrical connection formed by a first male contact 224 of the male connector 103. Additionally, the cross-sectional view 200 of the SPE connector 101 depicts the electrical connection between a conductive element of a second wire 132 of the SPE cable 104 and a second female contact 212 of the female connector 102 via an electrical connection formed by a second male contact 223 of the male connector 103.

The female connector 102 includes an inner female housing 210 (e.g., a first insulative housing) having a first contact retention recess structured to house the first female contact 211 and a second contact retention recess structured to house the second female contact 212. The first and second contact retention recesses provide support to the respective first and second female contacts 211 and 212 and also electrically isolate the first and second female contacts 211 and 212 from one another. In some embodiments, the first and second contact retention recesses extend all the way through the inner female housing 210 such that a portion of each of the first and second female contacts 211 and 212 extend from the inner female housing 210 on a first side and also provide an opening for respective male contacts 224 and 223 to mate with the first and second female contacts 211 and 212 on a second side. The inner female housing 210 may be formed from a single element or a composition of elements that are electrically insulative. Additional features of the inner female housing 210 in various embodiments are described in additional detail below.

The female connector 102 also includes an outer female housing 214 (e.g., an outer shield), a first female gasket 213, and a second female gasket 215. The outer female housing 214 is structured to house at least a portion of the inner female housing 210 therein. The outer female housing 214 may be formed of a material such as polymers, metals, or a combination thereof that provide rigid structural support. The outer female housing 214 may include one or more latching or mechanical connection structures that enable the outer female housing 214 to selectively couple and decouple to and from a respective male connector 103. For example, as depicted, the outer female housing 214 includes a threading within a portion of an inner diameter of the outer female housing 214 that is structured to mechanically connect the outer female housing 214 (and thereby the female connector 102) to a respective male connector 103. In alternative embodiments, other forms of mechanical connections may be used depending on the application of the SPE connector 101. In various embodiments, the outer female housing 214 may be made of copper, nickel, an alloy thereof or any conductive material that is configured to attenuate or block electromagnetic radiation. The thickness of the shield may be selected based on the application and materials used.

The first female gasket 213 is structured to be placed or positioned within a first female gasket retention recess of the inner female housing 210. For example, as will be described in additional detail below, the first female gasket 213 is structured to be placed on the first side of the inner female housing 210 (e.g., the same side as the first and second female contacts 211 and 212 extend from) and allow the first and second female contacts 211 and 212 to extend therethrough. In this way, the structure of the first female gasket 213 provides a seal on the first and second contact retention recesses of the inner female housing 210 on the first side. The seal ensures that moisture, dirt, or other particulates in the environment are unable to enter the SPE connector 101 at the first side. This may be particularly important because the first side of the female connector 102 is structured to mate with a respective electrical component (e.g., a PCB board) that may have moisture or particulates from the environment thereon.

The second female gasket 215 is structured to be placed or positioned around a portion of the inner female housing 210 on the second side and extend from the portion of the inner female housing 210 to an inner portion of the outer female housing 214. The second female gasket 215 is positioned such that a respective portion of the male connector 103 contacts the second female gasket 215 and a compression force between the female connector 102 and male connector 103 create a seal therebetween. The seal ensures that the exposed portions of the contacts within the SPE connector 101 when assembled are isolated from the external environment. Thus, the second female gasket 215 provides a barrier for the electrical connections between the contacts of the male connector 103 and female connector 102, which reduces the potential for moisture or other particulates from the environment to cause electrical shorting thereby improving the safety and integrity of the electronic connections.

The male connector 103 includes a front nut 220, a first inner housing 222, a first male contact 224, a second male contact 223, a first outer housing 225, a second inner housing 226, a male gasket 227, a cable seal 228, and a pressure nut 229. The front nut 220 is structured to house a portion of the first inner housing 222 and also has a mechanical connection mechanism structured to allow for the mechanical coupling and decoupling of the male connector 103 to a respective female connector 102. In this example, the mechanical connection mechanism includes a threading around an outer portion of the front nut 220. The threading is structured to be turned into a respective end of the outer female housing 214 to mechanically couple the male connector 103 with the female connector 102. In alternative embodiments, the mechanical connection mechanism may be of any structure that enables the male connector 103 to mechanically couple to the female connector 102. The front nut 220 is also structured such that the front nut 220 can be rotated independently of the other components of the male connector 103. For example, the independent rotation allows for the male connector 103 to be secured and tightened to the female connector 102 without the male electrical contacts 224 and 223 having to rotate and possibly causing a misalignment with respective female contacts 211 and 212.

The first inner housing 222 is structured to at least partially be inserted into the front nut 220. The first inner housing 222 includes a base that allows for a portion of the first male contact 224 and the second male contact 223 to extend therethrough into a cage-like structure defined by outer walls of the first inner housing 222. For example, the base includes openings that extend all the way through the base such that a portion of each of the contacts 224 and 223 extends from a bottom of the base into the cage-like structure. The first inner housing 222 is structured to provide mechanical support to the first and second male contacts 224 and 223 and also electrically isolate the first and second male contacts 224 and 223. The outer walls defining the cage-like structure are structured to prevent the first and second male contacts 224 and 223 from being bent or deformed when the male connector 103 is disconnected from the female connector 102. Moreover, the first inner housing 222 ensures that the first and second male contacts 224 and 223 are properly aligned with respective contacts 211 and 212 of the female connector 102 when joining with the male connector 103.

The first outer housing 225 may include an insulative portion. The insulative portion is structured to provide mechanical support to an insulation displacement contact (IDC) portion of the first and second male contacts 224 and 223. The first outer housing 225 is structured to be positioned over the second inner housing 226 such that the IDC portions of the first and second male contacts 224 and 223 mechanically and electrically connect to the first wire 131 and the second wire 132 when compressed together. This connection is discussed in further detail below in reference to FIGS. 6 and 7. In various embodiments, the first outer housing 225 includes an outer shell that is structured to attenuate or block electromagnetic radiation. For example, the outer shell is configured to sufficiently encapsulate at least a portion of the second inner housing 226, the insulative portion of the first outer housing 225, and a portion of the first inner housing 222 in order to provide structural protection thereto and to shield the contacts seated therein from electromagnetic radiation. In various embodiments, the outer shell may be made of copper, nickel, an alloy thereof or any conductive material that is configured to attenuate or block electromagnetic radiation. The thickness of the shield may be selected based on the application and materials used.

The cable seal 228 is structured to be seated within a cable recess of the second inner housing 226 and allow for the SPE cable 104 to extend therethrough from the environment into the second inner housing 226. The pressure nut 229 is structured to be placed over the cable recess and produce a compression force around the cable recess in order to mechanically compress the cable seal 228 to the SPE cable 104, thereby creating a mechanical frictional connection between the male connector 103 and the SPE cable 104. In addition to the mechanical frictional connection, the cable seal 228 may also create a hermetic seal between the environment and internal components of the SPE connector 101. In this way, the cable seal 228 improves the reliability and integrity of the electrical connections within the SPE connector 101. Additional details of the various components and assembly of the male connector 103 are described below in reference to FIGS. 5-10.

Figure 3A:
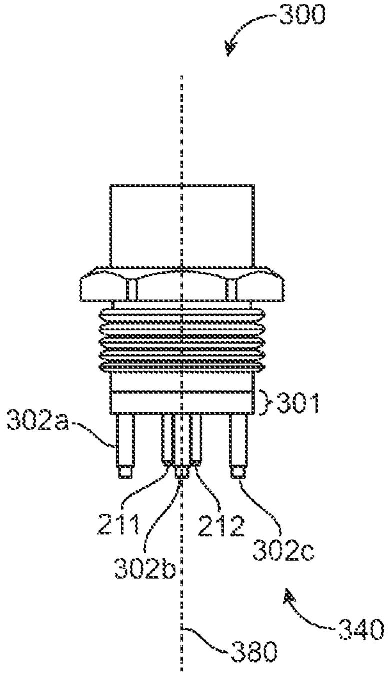
FIG. 3A is an isometric view of a female contact of the female connector of the SPE connector in accordance with illustrative embodiments.
Figure 3B:
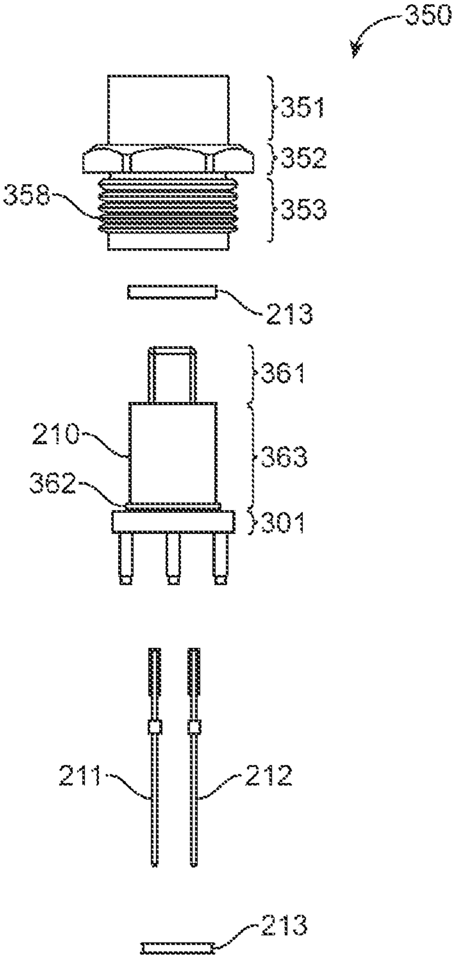
FIG. 3B is an exploded view of the female connector of the SPE connector in accordance with illustrative embodiments.

FIG. 3A depicts a side view 300 of a female connector 102 of the SPE connector 101 in accordance with illustrative embodiments. FIG. 3B depicts an exploded view 350 of the female connector 102 in accordance with illustrative embodiments. FIGS. 3A and 3B are discussed in tandem for purposes of explanation. The female connector 102 includes the outer female housing 214, the inner female housing 210, the first female contact 211, and the second female contact 212. In various embodiments, the female connector 102 may include the first female gasket 213 and the second female gasket 215. The first and second female contacts 211 and 212 extend from a first side 340 of the female connector 102 in a parallel direction along a first axis 380.

The inner female housing 210 includes a buffer portion 301 on the first side 340 that is structured to separate the outer female housing 214 from a respective electrical component. For example, the inner female housing 210 may be formed of an electrically insulative material to isolate the first and second female contacts 211 and 212 and the electrically-conductive outer female housing 214 from one another. Further, the buffer portion 301 extends outward from the first axis 380 to a diameter greater or equal to the diameter of the outer female housing 214 in order to electrically insulate the outer female housing 214 from a respective electrical component (e.g., a PCB board). The inner female housing 210 may also include one or more prongs 302*a-c* that extend from the first side 340 (e.g., the buffer portion 301) in a direction parallel to the first axis 380 (e.g., and parallel to the direction that the first and second female contacts 211 and 212 extend). The one or more prongs 302*a-c* are structured to be inserted into respective retention recesses or openings on the respective electrical components in order to provide support to female connector 102 and ensure that the first and second female contacts 211 and 212 are not deformed due to environmental turbulence or abuse.

The outer female housing 214 includes a first portion 351, a tightening portion 352, and a second portion 353. The first portion 351 is structured to mechanically connect to the male connector 103. As shown in additional detail in FIG. 4B, the first portion 351 includes a mechanical coupling mechanism. In this example, the mechanical coupling mechanism includes threads on an interior diameter of the first portion 351 that is structured to be threaded with a corresponding portion (e.g., the front nut 220) of the male connector 103. The outer female housing 214 also includes a retention rib (e.g., described in additional detail in reference to FIG. 4B) that allows for the outer female housing 214 to be mechanically secured via a frictional force and/or latching mechanism formed between the retention rib and a retention spine 362 of the inner female housing 210. The mechanical latch ensures that the outer female housing 214 is secured in place about the first axis 380 to the inner female housing 210 while also allowing the outer female housing 214 to rotate about the first axis 380 without movement of the inner female housing 210. Accordingly, in this example, the structure of the female connector 102 allows for the outer female housing 214 to rotate when assembling with a male connector 103 and for the threads to be tightened while ensuring that the female contacts 211 and 212 and inner female housing 210 remain aligned with corresponding contacts of the male connector 103. The tightening portion 352 is structured as a polygonal shape that allows for a user to achieve a superior grip on the outer female housing 214 in order to mechanically tighten the threads to a corresponding male connector 103 and form a hermetic seal between the male connector 103, the second female gasket 215, and the inner female housing 210.

The second portion 353 includes threads 358 on an exterior diameter of the outer female housing 214. The threads 358 allow for the female connector 102 to be mechanically secured to a corresponding electrical component via tightening of the threads 358 with threads of the corresponding device. Similar to as described above, the mechanical connection between the outer female housing 214 and the inner female housing 210 formed by the retention rib and the retention spine 362 allow for the pins of the first and second female contacts 211 and 212 to be placed in a stationary position relative to corresponding through-hole on the corresponding electrical component while the outer female housing 214 is rotated (e.g., threads 358 are tightened) and secured to the corresponding electrical component.

The inner female housing 210 includes a first portion 361, a base portion 363, the retention spine 362, the buffer portion 301, and the one or more prongs 302*a-c*. The first portion 361 includes an extension of the inner female housing 210 from the base portion 363 that is structured to be placed at least partially within the outer female housing 214 and have the second female gasket 215 disposed therebetween near or on the base portion 363. For example, the first portion 361 has less cross-sectional area compared to the base portion 363 that allows for the second female gasket 215 to be placed around the first portion 361 and supported along the first axis 380 by the base portion 363. The base portion 363 is structured to also at least partially be housed within the outer female housing 214. The base portion 363 includes the retention spine 362 disposed about the exterior diameter of the base portion 363 near the buffer portion 301. In various embodiments, the buffer portion 301 is positioned on a side opposite from the first portion 361.

The first and second female contacts 211 and 212 are structured to be seated within respective contact retention recesses of the inner female housing 210. Similarly, the first female gasket 213 is structured to be seated within a gasket recess of the inner female housing 210 to hermetically seal the interior of the SPE connector 101 when assembled. The structure of the first and second female contacts 211 and 212, the first female gasket 213, the gasket recess and the respective contact retention recesses are discussed in additional detail in reference to FIGS. 4A and 4B.

Figure 4B:
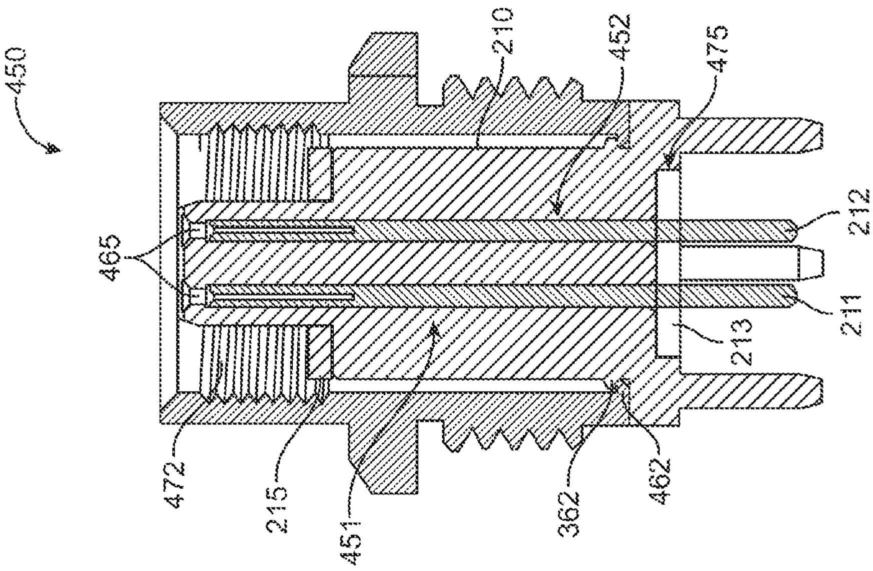
FIG. 4B is a cross-sectional view of the female connector in accordance with illustrative embodiments.
Figure 4A:
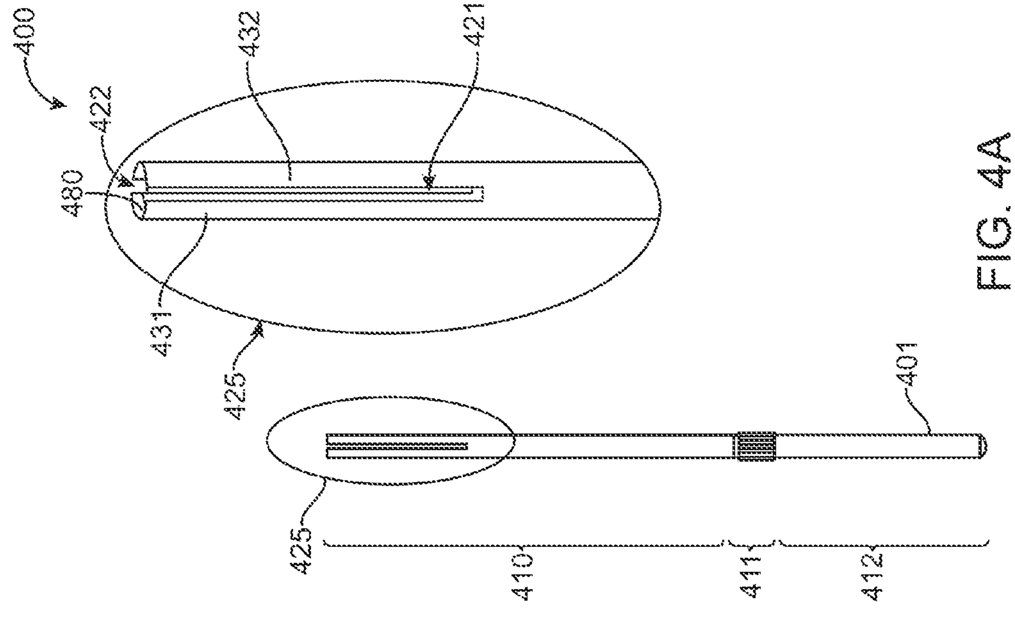
FIG. 4A is an isometric view of a contact of the female connector in accordance with illustrative embodiments.

FIG. 4A is an isometric view 400 of a female contact 401 of the female connector 102 in accordance with illustrative embodiments. For example, the female contact 401 may be similar to the first female contact 211 and the second female contact 212. The isometric view 400 includes an isometric view of the female contact 401 and a zoomed view 425 of the female contact portion (e.g., receiving portion) 410 of the female contact 401.

The female contact 401 includes a receiving portion 410, a connection portion 411, and a contact tine 412 that all extend parallel relative to one another. The contact tine 412 extends away from the connection portion 411 and is structured to protrude from the inner female housing 210 such that the contact tine 412 can create a mechanical and electrical connection when inserted into a respective receptacle of a corresponding electrical component. The receiving portion 410 extends from an opposite side of the connection portion 411. A distal end of the receiving portion 410 may be hollow with a tapered edge 480 toward the hollow portion such that a respective male contact can be inserted therein. The hollow portion may also include a first slit 421 and a second slit 422 that extend the distance of the hollow portion. The first slit 421 and second slit 422 define a first prong 431 and a second prong 432 of the receiving portion 410. The first and second prongs 431 and 432 allow for a respective male contact to be inserted therebetween (e.g., in the hollow portion) and may compress the male contact with an elastic force thereby creating a reliable mechanical and electrical connection between the male contact and the female contact 401. The connection portion 411 may have an outer diameter greater than an outer diameter of the receiving portion 410 and the connection portion 411. Moreover, the outer diameter of the connection portion 411 may have abrasions thereon such that the female contact 401 can be securely seated within a respective contact retention recess of the inner female housing 210.

FIG. 4B is a cross-sectional view 450 of the female connector 102 in accordance with illustrative embodiments. The cross-sectional view 450 depicts a first female contact retention recess 451, a second female contact retention recess 452, the first female gasket 213, and the second female gasket 215. Moreover, the cross-sectional view 450 depicts the outer female housing 214 mechanically connected to the inner female housing 210 via a mechanical frictional force created between the retention spine 362 of the inner female housing 210 and a retention rib 462 of the outer female housing 214. As discussed above, the mechanical connection formed between the retention rib 462 and the retention spine 362 allows for the outer female housing 214 to rotate about the inner female housing 210, which improves the ability for the female connector 102 to be connected to a male connector 103. A threading 472 on the inside diameter of the first portion of the outer female housing 214 allows for mechanical connection and disconnection to respective male connector 103.

The first and second female contacts 211 and 212 (e.g., such as female contact 401) may be inserted into the respective first and second female contact retention recesses 451 and 452 via a compression force until the female contacts 211 and 212 are stopped by a tapered opening 465 on the first portion of the inner female housing 210. The connector portion 411 of each female contact 211 and 212 creates a frictional force within the inner diameter of the respective contact retention recesses 451 and 452 to ensure that they are securely held in place. The respective tapered opening 465 serves as a stop for the first and second female contacts 211 and 212 to prevent over insertion thereby improving the assembly process and overall structural certainty of the female connector 102. Moreover, the tapered opening 465 also serves as a guide for respective male contacts 224 and 223 to be guided and inserted into the receiving portions of the first and second female contacts 211 and 212.

The inner female housing 210 also includes a gasket retention recess 475 that is structured to receive the first female gasket 213. The first female gasket 213 may be placed within the gasket retention recess 475, for example, after the first and second female contacts 211 and 212 are compressed into the respective first and second female contact retention recesses 451 and 452. The first female gasket 213 is structured to create a seal around the contact tine 412 of the first and second female contacts 211 and 212 and the inner female housing 210. In this way, the first female gasket 213 provides a seal such as the hermetic seal that blocks moisture or particulates from entering the first and second contact retention recesses 451 and 452.

Figure 5:
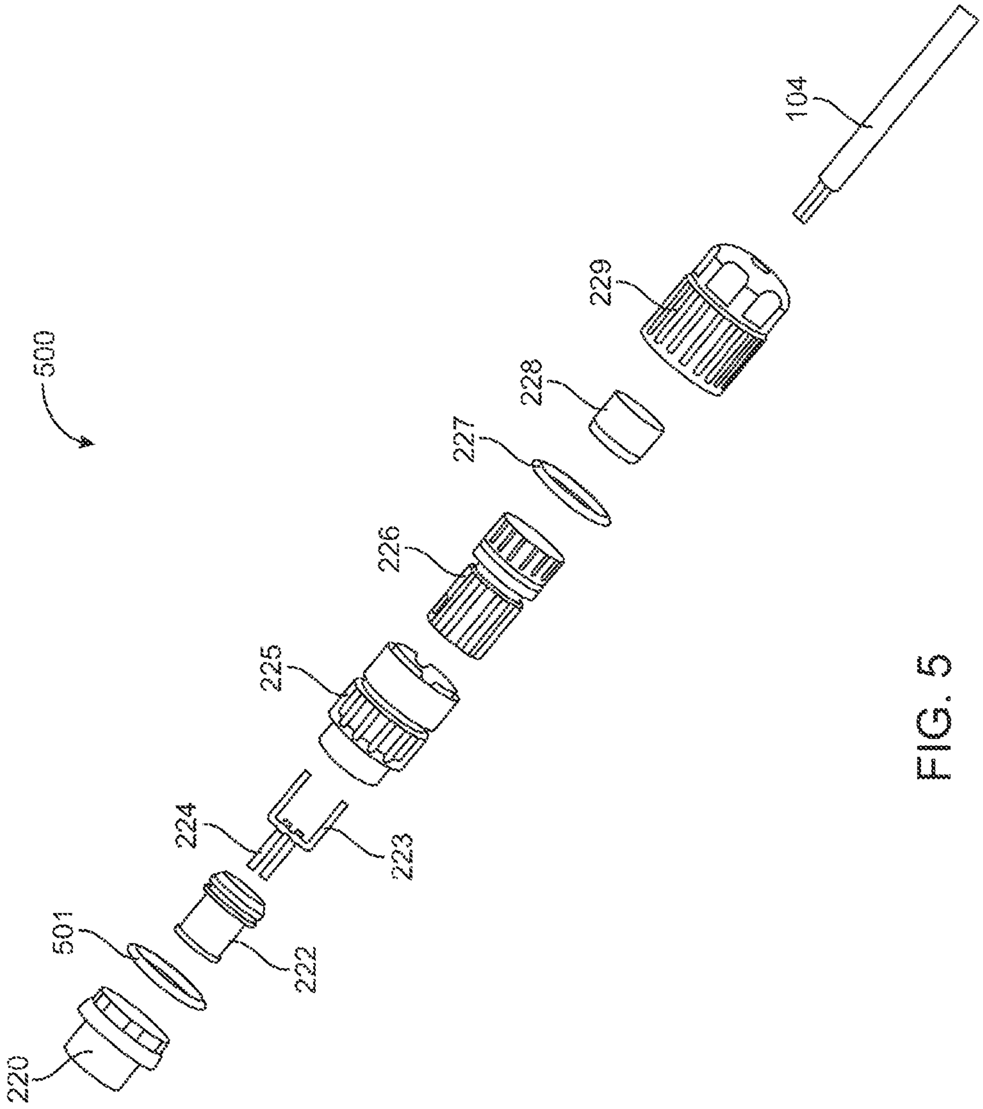
FIG. 5 is an exploded view of a male connector of the SPE connector in accordance with illustrative embodiments.

FIG. 5 is an exploded view 500 of a male connector 103 of the SPE connector 101 in accordance with illustrative embodiments. The exploded view 500 includes the SPE cable 104 and the male connector 103 having the front nut 220, a first male gasket 501, the first inner housing 222, the first male contact 224, the second male contact 223, the first outer housing 225, the second inner housing 226, the second male gasket 227, the cable seal 228, and the pressure nut 229 disassembled.

The first male gasket 501 is structured to be seated with a first end of the front nut 220 and the first inner housing 222 is structured to be housed at least partially within the front nut 220 with the first male gasket 501 disposed therebetween to create a seal. The first and second male contacts 224 and 223 are structured to be positioned partially within the first inner housing 222 and partially within the second inner housing 226. The first outer housing 225 is structured to mechanically connect to the front nut 220 on a first side and the pressure nut 229 on a second side. Moreover, the first outer housing 225 is structured to house or partially encapsulate a portion of the second inner housing 226 and a portion of the first inner housing 222. The second male gasket 227 is structured to be seated around an outer diameter of the second inner housing 226 to create a second seal. The cable seal 228 is structured to be housed at least partially within a cable end of the second inner housing 226 with the SPE cable 104 extending therethrough such the pressure nut 229 creates a compression force on the cable end of the second inner housing 226 and the cable seal 228 thereby generating a mechanical connection between the male connector 103 and the SPE cable 104. The various connections of the male connector 103 are discussed in further detail in reference to FIGS. 6-9B.

Figure 6:
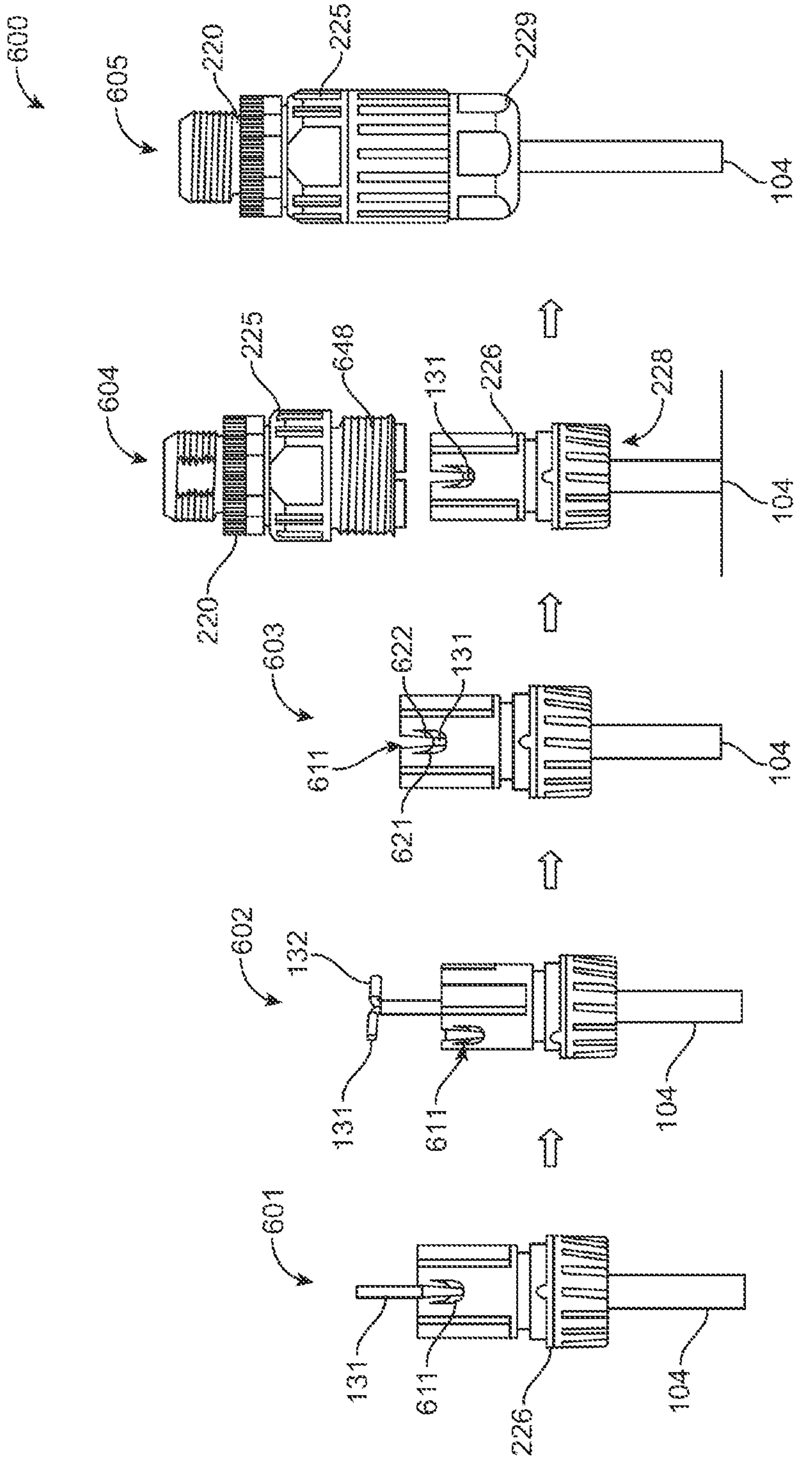
FIG. 6 is an assembly view of the male connector with a corresponding wire in accordance with illustrative embodiments.

FIG. 6 is an assembly view 600 of the male connector 103 with a corresponding SPE cable 104 in accordance with illustrative embodiments. The assembly view 600 includes a process flow of assembly from a first state 601 to an assembled state 605. The first state 601 depicts the SPE cable 104 inserted through the second inner housing 226. The second inner housing 226 includes a first wire retention groove 611 and a second wire retention groove 811 positioned on opposite sides of the second inner housing 226.

In a second state 602, the first wire 131 is bent perpendicular to the direction in which the SPE cable 104 extends through the second inner housing 226 such that the first wire is aligned with the first wire retention groove 611. Further, the second wire 132 is bent perpendicular to the direction in which the SPE cable 104 extends through the second inner housing 226 such that the second wire 132 is positioned over the second wire retention groove 811. The first and second wire retention grooves 611 and 811 are tapered such that the groove narrows from a wide portion near an edge of the second inner housing 226 to a narrow portion as the first and second wire retention grooves 611 and 811 extend into the second inner housing 226 from the edge. This narrowing allows for a frictional force to mechanically secure the first wire 131 within the first wire retention groove 611 and a frictional force to mechanically secure the second wire 132 within the second wire retention groove 811 as the first and second wires 131 and 132 are compressed into the respective first and second wire retention grooves 611 and 811.

In some embodiments, the first and second wire retention grooves 611 and 811 may include a first member 621 and a second member 622 that extend inward toward a centerline axis on respective sides of the groove (e.g., wire retention groove 611) as the first and second members 621 and 622 extend from the edge of the second inner housing 226. The first and second members 621 and 622 may be disposed on respective sides of the retention grooves 611 and 811 and cantilevered in the same direction that the wire retention groove extends into the second inner housing 226 (e.g., toward the fingers). During insertion or compression of a wire into the wire retention groove 611, the first member 621 and the second member 622 may be forced away from the centerline axis of the groove (e.g., wire retention groove 611) as the respective wire (e.g., first wire 131) is compressed into the groove (e.g., wire retention groove 611) and relax to a resting position after the wire (e.g., first wire 131) has been fully inserted. The relaxation of the first and second members 621 and 622 causes the space between the distal ends of the members to become smaller thereby locking the wire into place within the wire retention groove 611 once the wire is compressed past a distal end (e.g., a furthest extent) of the first and second members 621 and 622. Alternatively or additionally, a frictional fit between the wire and the outer edges of the wire retention groove 611 may mechanically secure the wire therein. For example, the outer edges may have a thickness that is less than a thickness of an outer wall of the second inner housing 226. In some embodiments, the outer edges may be beveled or tapered such that the thickness toward a bottom of the wire retention groove 611 creates a blade-like structure that is able to enhance the frictional force between the insulation of the wire and the outer edges thereby providing a secure mechanical connection between the wire and the second inner housing 226. In various embodiments, the first and second members 621 and 622 also ensure that the wire (e.g., first wire 131) is mechanically secured within the respective groove (e.g., wire retention groove 611).

In a third state 603, the first wire 131 is compressed into the first wire retention groove 611 and the second wire 132 is compressed into the second wire retention groove 811. For example, in the third state 603, the first wire retention groove 611 has formed a mechanical connection with the first wire 131 via a frictional force and/or locked into the first wire retention groove 611 via the first and second members 621 and 622. The second wire 132 is similarly mechanically secured within the second wire retention groove 811.

In a fourth state 604, the first outer housing 225 having the first and second male contacts 224 and 223 disposed therein is positioned adjacent to the second inner housing 226 such that an IDC portion of the first contact 224 is aligned with the first wire retention groove 611 and an IDC portion of the second contact 223 is aligned with the second wire retention groove 811. The alignment of the IDC portions adjacent to the respective wire retention grooves (e.g. wire retention groove 611) ensures that when the first outer housing 225 is compressed onto the second inner housing 226 that the IDC contact portions (e.g., the blades of the IDC contact portion) displace insulation on the respective wires (e.g., first wire 131) and electrically connect to the conductive core of the respective wires (e.g., first wire 131). The compression of the first outer housing 225 having the first and second male contacts 224 and 223 disposed therein onto the second inner housing 226 having the first and second wires 131 and 132 positioned within respective grooves (e.g., first wire retention groove 611) causes a mechanical and electrical connection to form between the first male contact 224 and the conductive core of the first wire 131 and a mechanical and electrical connection to form between the second male contact 223 and the conductive core of the second wire 132.

In the assembled state 605, the pressure nut 229 and the cable seal 228 have been joined with the threading 648 on the first outer housing 225. For example, the pressure nut 229 includes threads on an interior diameter that are structured to be threaded with threading 648 of the first outer housing 225. As the pressure nut 229 is tightened to the first outer housing 225, the second inner housing 226 is compressed therebetween forming the mechanical and electrical connections between the first and second male contacts 224 and 223 and their respective wires 131 and 132. Moreover, the tightening causes pressure nut 229 to become mechanically secured to the first outer housing 225, which in this example has already been mechanically secured to the front nut 220. The front nut 220, the first outer housing 225, and the pressure nut 229 form an exterior housing having the remaining portions of the male connector 103 secured therein. In some embodiments, the front nut 220, the first outer housing 225, and the pressure nut 229 are each made from an electrically conductive material such that the exterior housing is able to shield the electrical connections therein from RF radiation or interference. In various embodiments, the front nut 220, the first outer housing 225, and the pressure nut 229 are each made from an electrically insulative material, but rigid elements such as the exterior housing are able to protect the structural integrity of the male connector 103. For example, the front nut 220, the first outer housing 225, and the pressure nut 229 are each made from a polymer, metal such as copper, or a combination thereof depending upon the application.

Figure 7:
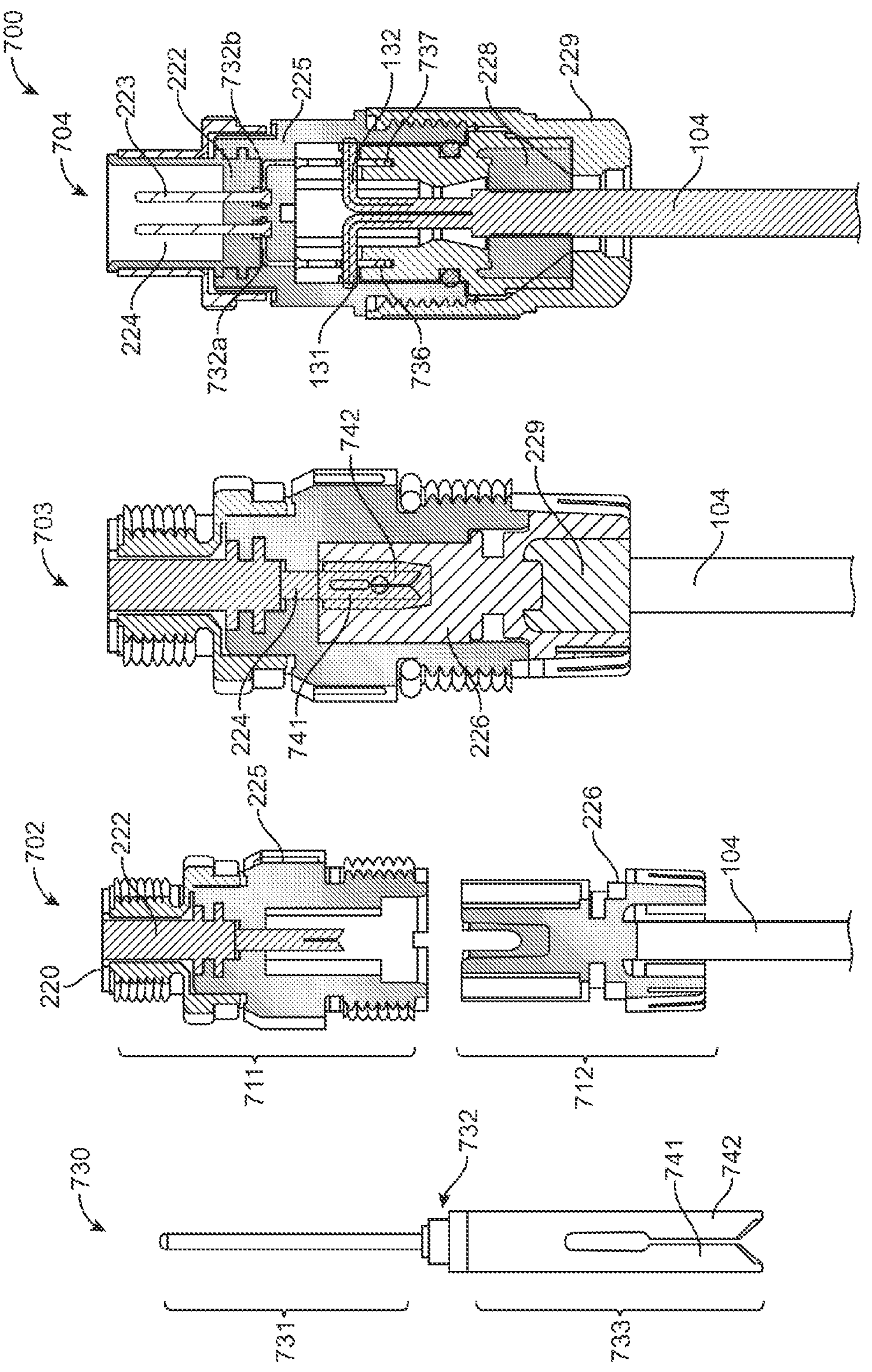
FIG. 7 depicts various views of the male connector and a contact of the male connector in accordance with illustrative embodiments.

FIG. 7 depicts various views 700 of the male connector 103 and a male contact 730 of the male connector 103 in accordance with illustrative embodiments. In various embodiments, the male contact 730 is similar to the first and second male contacts 224 and 223 described herein. The various views 700 include a first view of the male contact 730, a first cross-sectional view 702 of a first connection process, a second cross-sectional view 703 of a second connection process, and a third cross-sectional view 704 that is a perpendicular cross-sectional view relative to the second cross-sectional view 703. The various views 700 depict the assembly process and resulting structural assembly of the male connector 103 with an SPE cable 104.

The male contact 730 includes a contact tine 731, a transition portion 732, and an IDC portion 733. The contact tine 731 extends from a first end (e.g., proximal end) of the transition portion 732 in a first direction. The contact tine 731 is structured to be inserted into a receiving portion of a respective female contact. The transition portion 732 extends perpendicularly relative to the first direction. The shape of the transition portion 732 and the male contact 730 as a whole allows the contact tine 731 to be securely seated within the male connector 103 and also ensures that the contact tine 731 is aligned with the receiving portion of the respective female contact and that the IDC portion 733 is aligned with a respective IDC slot on the second inner housing 226 and corresponding wire (e.g., first wire 131). For example, the shape of the male contact 730 (e.g., the transition portion 732 extending perpendicularly to the contact tine 731 and the IDC portion 733) allows for the male contact 730 to be mechanically secured within the male connector 103. In some embodiments, the transition portion 732 is mechanically secured between the first inner housing 222 and the first outer housing 225 via an interference fit that also properly aligns the IDC portion 733 and the male contact tine 731 within the male connector 102. In this way, a secure and reliable mechanical and electrical connection can be formed between a respective wire (e.g., first wire 131) of the SPE cable 104, a female contact, and the male contact 730 when the SPE connector 101 is assembled. The contact tine 731 extends along a first plane that is perpendicular from a plane that the transition portion 732 extends. The contact tine 731 also includes a tapered edge at a distal end that allows for the contact tine 731 to be received by a respective tapered portion of the receiving portion of the female contact.

The IDC portion 733 extends from a second end (e.g., distal end) of the transition portion 732 along a direction that is opposite from the first direction. For example, the IDC portion 733 extends along a plane that is parallel to the first plane that the contact tine 731 extends. In various embodiments, the IDC portion 733 extends along a plane that is parallel to the first plane that the contact tine 731 extends. The IDC portion 733 includes a first blade 741 and a second blade 742 at a distal end that include tapers 751 to allow for a respective wire (e.g., first wire 131) to be guided between the first and second blades 741 and 742 when the male contact 730 is compressed downward onto the respective wire (e.g., first wire 131). The first and second blades 741 and 742 are structured to displace the insulation on the respective wire (e.g., first wire 131) in order to form a mechanical and electrical connection therebetween.

In the first cross-sectional view 702, a first portion 711 of the male connector 103 is depicted separated from a second portion 712 of the male connector 103. The first portion 711 includes the front nut 220 and the first and second male contacts 224 and 223 disposed between the first inner housing 222 and an inner portion of the first outer housing 225 such that the respective transition portions 732 are seated and secured within respective grooves (e.g., first wire retention groove 611) therebetween. The second portion 711 includes the second inner housing 226 with the first and second wires 131 and 132 seated within respective wire retention grooves (e.g., wire retention groove 611). In the first cross-sectional view 702, the first portion 711 is positioned adjacent to the second portion 712 such that the IDC portions 733 of the first and second male contacts 224 and 223 are positioned adjacent to respective IDC slots on the second inner housing 226.

In the second cross-sectional view 703, the first portion 711 is joined with the second portion 712. For example, the first portion 711 may have been compressed onto the second portion 712 causing the IDC portion 733 to enter a respective IDC slot on the second inner housing 226 in order for the first and second blades 741 and 742 to mechanically and electrically secure to the respective wire (e.g., first wire 131). Moreover, the cable seal 228 is also positioned within the cage-like structure formed by the multiple fingers of the second inner housing 226.

In the third cross-sectional view 704, the pressure nut 229 is joined with the remaining components of the male connector 103. In the third cross-sectional view 704, first wire 131 is mechanically and electrically connected to the first male contact 224 and the second wire 132 is mechanically and electrically connected to the second male contact 223. The IDC portion 733 of the first male contact 224 is positioned within a first IDC slot 736 of the second inner housing 226 and the IDC portion 733 of the second male contact 223 is positioned within a second IDC slot 737 of the second inner housing 226. Moreover, the third cross-sectional view 704 depicts the transition portion 732_a_ of the first male contact 224 and the transition portion 732_b_ of the second male contact 223 in a configuration that allows the transition portion 732*a*, 732*b* to be mechanically secured (e.g., seated) between the first inner housing 222 and the first outer housing 225 and align the respective IDC portions 733 of the male contacts (e.g., first male contact 224) with the respective IDC slots 736 and 737.

Figure 8B:
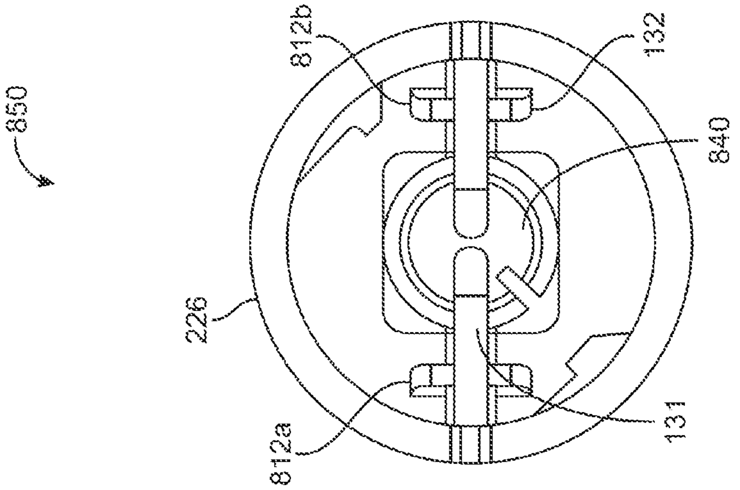
FIG. 8B is a top-down view of the portion of the male connector in accordance with illustrative embodiments.
Figure 8A:
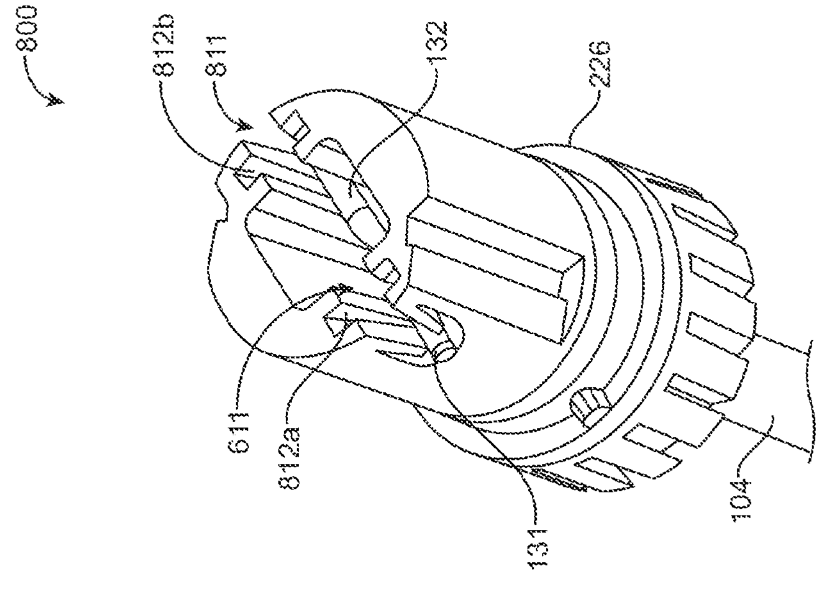
FIG. 8A is an isometric view of a portion of the male connector in accordance with illustrative embodiments.

FIG. 8A is an isometric view 800 of a portion of the male connector 103 in accordance with illustrative embodiments. FIG. 8B is a top-down view 850 of the portion of the male connector 103 in accordance with illustrative embodiments. FIGS. 8A and 8B depict the joining of the second inner housing 226 of the male connector 103 with a respective SPE cable 104 and are discussed in tandem for purposes of explanation. For example, the isometric view 800 and top-down view 850 depict various additional angles to the third state 603 discussed in reference to FIG. 6.

The portion of male connector 103 depicted includes the second inner housing 226 with the SPE cable 104 mechanically attached thereto. The first wire 131 has been seated within the first wire retention groove 611 and the second wire 132 has been seated within the second wire retention groove 811. The first and second wire retention grooves 611 and 811 also have IDC slots 812*a-b* that are structured to receive a respective IDC portion 733 of the male contact (e.g., male contact 224). The IDC slots 812*a-b* extend in a plane that is perpendicular to a plane that the first and second wire retention grooves 611 and 811 extend such that the IDC slots 812*a-b* intersect with the respective wire retention groove. The IDC slots 812*a-b* are located radially from a centerline axis of the second inner housing 226 such that a bottom of the first and second wire retention grooves 611 and 811 are able to support the first and second wires 131 and 132 as the respective IDC contacts (e.g., first male contact 224) are compressed onto the first and second wires 131 and 132. An opening 840 extends all the way through the second inner housing 226 such that a respective SPE cable 104 may be inserted therethrough.

Figure 9A:
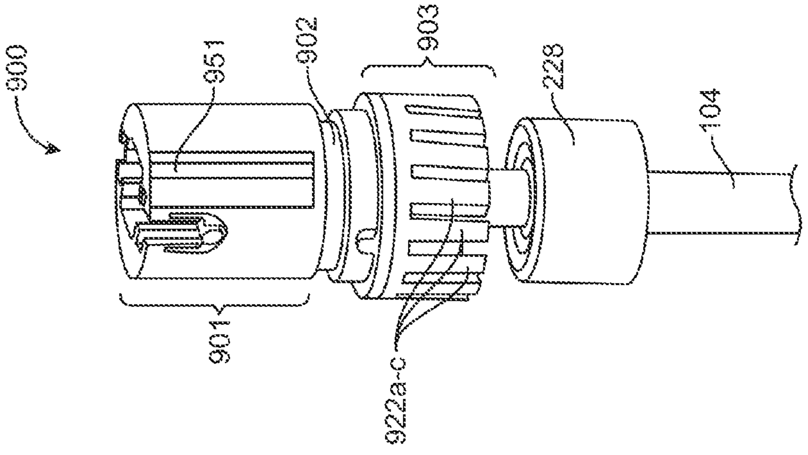
FIGS. 9A and 9B are assembly views of the male connector in accordance with illustrative embodiments.
Figure 9B:
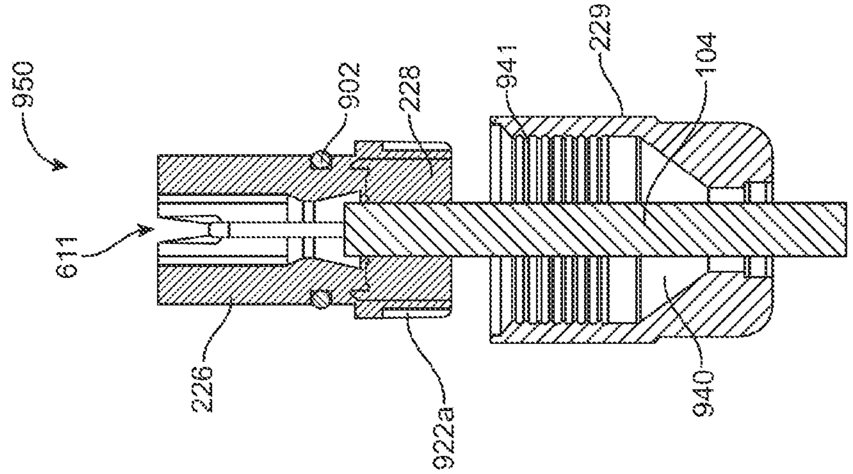

FIGS. 9A and 9B are assembly views 900 and 950 of the male connector 103 in accordance with illustrative embodiments. FIG. 9A depicts an assembly process 900 of assembling the SPE cable 104 with the male connector 103. FIG. 9B depicts a cross-sectional view 950 of an assembly process between the second inner housing 226 and the pressure nut 229 of the male connector 103. For example, the second inner housing 226 includes a first portion 901, a gasket retention trench 902, and a seal portion 903. The first portion 901 includes the first and second wire retention grooves 611 and 811. Moreover, the first portion 901 may include one or more notches or channels 951 that such that the first inner housing 222 and the first outer housing 225 are only able to be joined with the second inner housing 226 in a configuration that aligns the IDC portions 733 of the first and second male contacts 224 and 223 with the respective first and second wire retention grooves 611 and 811. In this way, the notches or channels 951 and the corresponding shape of the first inner housing 222 and the first outer housing 225 ensure proper alignment during assembly.

The gasket retention trench 902 is structured to securely seal the second male gasket 227 as the male connector 103 is assembled, thereby ensuring that the male connector 103 is properly sealed from environmental conditions. The seal portion includes multiple fingers 922*a-f* that extend in a direction parallel to the direction in which the SPE cable 104 extends through the second inner housing 226. The multiple fingers 922*a-f* form a cage-like structure that is structured to receive the cable seal 228 positioned around the SPE cable 104. Moreover, the multiple fingers 922*a-f* allow for a tapered portion 940 of the pressure nut 229 to compress the multiple fingers 922*a-f* toward the SPE cable 104 when tightened or compressed over the multiple fingers 922*a-f*, thereby forming a frictional force between the cable seal 228 and the SPE cable 104. The frictional force creates a rigid mechanical connection between the SPE cable 104 and the male connector 103 in addition to the electrical and mechanical connections formed at the first and second wires 131 and 132 at the respective first and second wire retention grooves 611 and 811.

The pressure nut 229 also includes, as discussed above, threading 941 along an interior diameter along a first portion 939 adjacent to the tapered portion 940. The threading 941 along the first portion 939 is structured to be threaded with the threading 648 on the exterior of the first outer housing 225 in order to mechanically secure the pressure nut 229 to the first outer housing 225.

Figure 10:
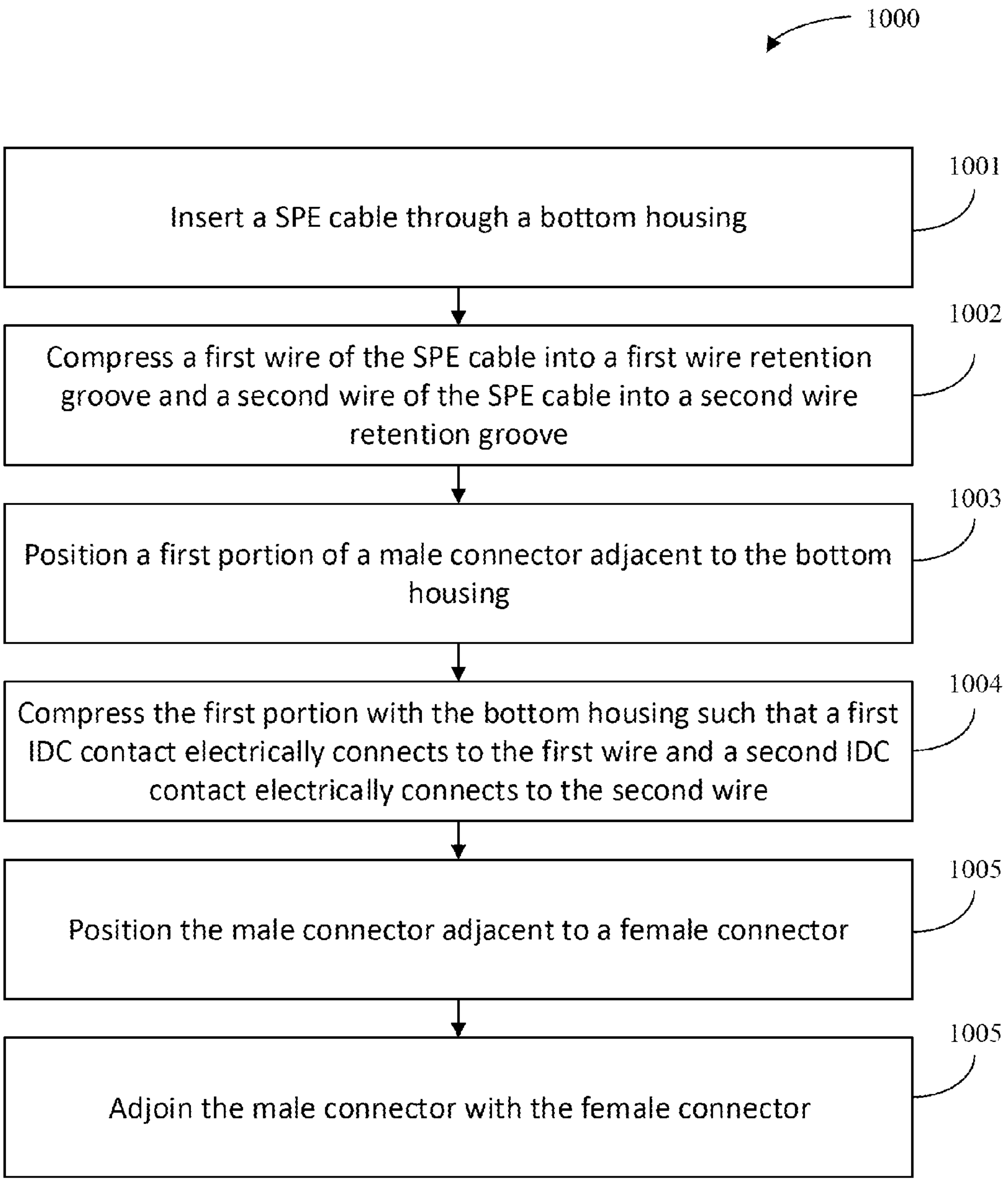
FIG. 10 is a flow diagram of a method of use (assembly) of the SPE connector in accordance with an illustrative embodiment.

FIG. 10 is a flow diagram of a method 1000 of use (assembly) of the SPE connector 101 in accordance with an illustrative embodiment. For example, the method 1000 discusses various processes or operations of assembling the SPE connector 101 in order to form the electrical and mechanical connections discussed herein.

At process 1001, an SPE cable 104 is inserted through a second inner housing 226 of the male connector 103. The SPE cable 104 is extended through an opening of the second inner housing 226 at a wire seal portion to a second end of the second inner housing 226. In various embodiments, the opening extends along a first axis 380 in which the SPE cable 104 extends once inserted through the second inner housing 226.

At process 1002, a first wire 131 of the SPE cable 104 is compressed into a first wire retention groove 611 of the second inner housing 226 and a second wire 132 of the SPE cable 104 is compressed into a second wire retention groove 811 of the second inner housing 226. In various embodiments, the first wire 131 is bent perpendicular to the first axis 380 and compressed into the first wire retention groove 611 such that a frictional force mechanically secures the first wire 131 into the first wire retention groove 611. Similarly, the second wire 132 may be bent perpendicular to the first axis 380 and compressed into the second wire retention groove 811 such that a frictional force mechanically secures the second wire 132 into the second wire retention groove 811. In some embodiments, the first and second wires 131 and 132 may be mechanically secured into the respective first and second wire retention grooves 611 and 811 via a locking mechanism of the first and second wire retention grooves 611 and 811 having a first member 621 and a second member 622. In some embodiments, the first wire 131 and the second wire 132 are bent such that they extend along the same plane but in opposite directions.

At process 1003, a first IDC portion 733 of a first male contact 224 is positioned adjacent to the first wire retention groove 611 and a second IDC portion 733 of a second male contact 223 is positioned adjacent to the second wire retention groove 811. In various embodiments, the first male contact 224 and the second male contact 223 are secured within a first IDC portion 733 of the male contact 224 such that transition portions of the first and second male contacts 224 and 223 mechanically secure the first and second male contacts 224 and 223 within the first portion. In an embodiments, the transition portions are held between a first inner housing 222 and a first outer housing 225 of the first portion. The first portion of the male connector 103 may be positioned adjacent to the second inner housing 226 such that the first IDC portion is aligned with a first IDC slot 736 and the second IDC portion 733 is aligned with a second IDC slot 737 of the second inner housing 226. The first and second IDC slots 736 and 737 are structured to receive the respective IDC portions 733 such that a first blade 741 and a second blade 742 of the IDC portions 733 are able to enter the first and second IDC slots 736 and 737 and make contact with a respective wire (e.g., first wire 131) retained therein (e.g., the first and second slots are intersecting with respective wire retention grooves).

At process 1004, the first and second male contacts 224 and 223 are compressed into the respective wire retention grooves 611 and 811. In various embodiments, the first portion of the male connector 103 is compressed with or adjoined with the second inner housing 226 such that the first and second IDC portions 733 contact a respective wire (e.g., first wire 131) disposed within the wire retention grooves 611 and 811. The IDC portions 733 displace the insulation of the wire (e.g., first wire 131) via one or more blades (e.g., first blade 741) and form an electrical and mechanical connection with the wire (e.g., first wire 131). In some embodiments, a cable seal 228 is positioned at an end of the second inner housing 226 opposite from the first portion of the male connector 103 with a pressure nut 229. The pressure nut 229 may be tightened to the first portion of the male contact (e.g., male contact 224) such that the second inner housing 226 is mechanically secured therein. Moreover, in an embodiment, the pressure nut 229 may compress the cable seal 228 inward toward the SPE cable 104 to form a mechanical connection between the SPE cable 104 and the male connector 103.

At process 1005, the male connector 103 is positioned adjacent to a female connector 102. The male connector 103 is positioned adjacent to the female connector 102 such that contact tines of the first and second male contacts 224 and 223 are aligned with respective receiving portions of the female contacts 211 and 212 housed within the female connector 102. In various embodiments, the female connector 102 includes an outer female housing 214 that is able to rotate about an inner insulative female housing 210 that holds the female contacts 211 and 212. The male connector 103 is positioned such that threads on the male connector 103 can be mated and tightened with threads on the outer female housing 214.

At process 1006, the male connector 103 is adjoined with the female connector 102 such that a first contact tine of the first male contact 224 is mechanically and electrically connected to a first receiving portion of a first female contact 211 and a second contact tine of the second male contact 223 is mechanically and electrically connected to a second receiving portion of a second female contact 212. For example, the outer female housing 214 may be able to freely rotate about the inner female housing 210 of the female connector 102 such that the outer female housing 214 can be tightened via respective threads on the male and female connectors 103 and 102 without causing a misalignment between the contact tines of the first and second male contacts 224 and 223 and the respective receiving portions of the first and second female contacts 211 and 212.

In various embodiments, the female connector 102 may be mechanically and electrically connected to a corresponding electrical device. For example, a contact tine of the first female contact 211 may have been inserted into a through-hole or receiving portion of a first male contact 224 on the corresponding device and a contact tine of the second female contact 212 may have been inserted into a through-hole or receiving portion of a second male contact 223 on the corresponding device. In such an example, the first contact of the device is electrically connected to the first wire 131 of the SPE cable 104 via the first male contact 224 and the first female contact 211, and the second contact of the device is electrically connected to the second wire 132 of the SPE cable 104 via the second male contact 223 and the second female contact 212. In this configuration, the electrical connections may easily and reliably be formed and deformed via the adjoining and disjoining of the male connector 103 and the female connector 102.

Moreover, in an embodiment, once the insulative housing is compressed onto the IDC contacts, the insulative housing may be mechanically secured to an outer shield of male connector 103 such that the insulative housing and the IDC contacts are at least partially encapsulated within the outer shield. For example, the insulated housing may be compressed onto the IDC contacts that are positioned on a base portion of the outer shield. A first portion (e.g., a first wing) of the outer shield may then be folded up and/or around the insulative housing and a second portion (e.g., a second wing) may be folded up and/or around the insulative housing such that the insulative housing and IDC contacts are mechanically secured therein. In some embodiments, the first portion and the second portion are made from a flexible material that can be deformed in order to wrap around the insulative housing. In this configuration, the insulative housing is mechanically secured to the outer shield at least by the wire retention portion, the base portion, the first portion, and the second portion of the outer shield. The encapsulation by the outer shield provides RF protection to the contacts positioned therein to ensure the integrity of any electrical signals carried by the IDC contacts.

In an operation 1406, the male connector 103 is adjoined with the female connector 102 such that an electrical connection is formed between a first conductive hole of the printed circuit board and the first wire 131 and an electrical connection is formed between a second conductive hole of the printed circuit board and the second wire 132. In an embodiment, the male connector 103 is positioned adjacent to the female connector 102 such that pins of the male connector 103 are aligned with an opening of the recesses of the female connector 102. The male connector 103 is compressed into the female connector 102 such that an electrical and mechanical connection of contacts of the male connector 103 is formed with respective contacts in the female connector 102. In some embodiments, a latching pin of the male connector 103 may mate with an opening on the female connector 102 in order to mechanically secure the male connector 103 with the female connector 102.

FIG. 11 is an exploded view 1100 of a second example of a female connector 102 of the SPE connector beside a view of the assembled female connector 102 in accordance with illustrative embodiments. In this embodiment, the female connector 102 includes an outer female housing 1101, an inner female housing 1102, a contact shell 1103, a first female contact 1111, and the second female contact 1112. In some embodiments, the first female contact 1111 and the second female contact 1112 may be similar to the female contacts 211, 212, and 401 described herein. Moreover, the outer female housing 1101 may be similar to the outer female housing 214 described herein.

The contact shell 1103 includes a cage-like structure 1130 having openings on either side of the cage-like structure 1130 and having a first tine 1131 extending from a first wall of the cage-like structure 1130 and a second tine 1132 extending from a second wall of the cage-like structure 1130. The first and second tines 1131 and 1132 extend in a parallel direction relative to one another. The first and second tines 1131 and 1132 are configured to extend through openings on the inner female housing 1102 and create a frictional fit with the respective female contacts that are inserted on an opposite side of the inner female housing 1102. The cage-like structure 1130 is structured to be seated on (e.g., wrapped around) an extended portion 1120 of the inner female housing 1130. In this way, the contact shell 1130 is able to hold positioning of the female contacts 1111 and 112 within the inner female housing 1102 when assembled. Moreover, the contact shell 1103 or a portion thereof may be formed of metal materials such as copper or an alloy thereof thereby improving the radio-frequency (RF) shielding of the SPE connector 101 via shielding a portion of the first and second female contacts 1111 and 1112.

In various embodiments, the female connector 102 may be assembled via adjoining the contact shell 1103 with the inner female housing 1102 such that the tines 1131 and 1132 extend through respective openings on the inner female housing 1102. The first and second female contact tines 1111 and 1112 may be inserted into the respective openings on the opposite side of the inner female housing 1102 such that contact is made between the tines 1131 and 1132 and respective contacts 1111 and 1112. A first gasket 1105 may be placed within a groove of the inner female housing 1102 and a second gasket 1106 may be positioned between the outer female housing 1101 and the inner female housing 1102 before the outer female housing 1101 and inner female housing 1102 are adjoined together in a manner similar to described above.

Figure 11A:
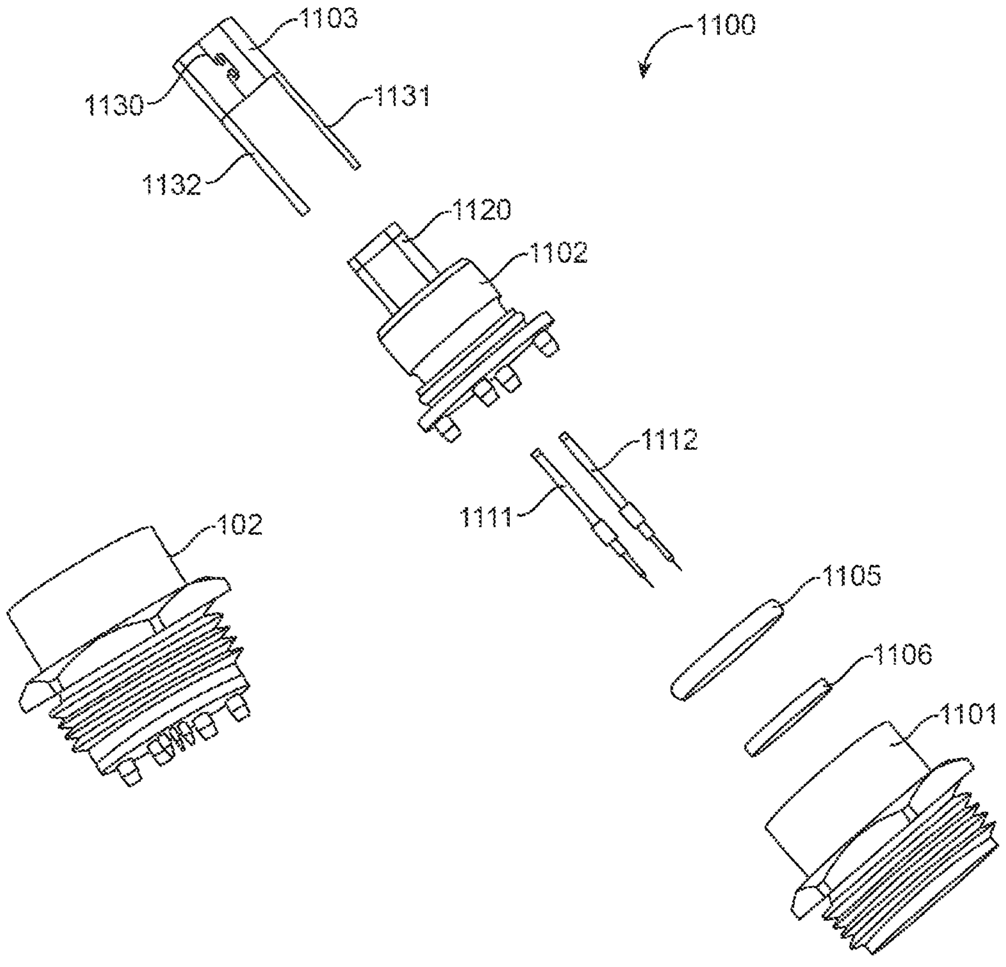
FIG. 11A is an exploded view of a second example of a female connector of the SPE connector in accordance with illustrative embodiments.
Figure 11C:
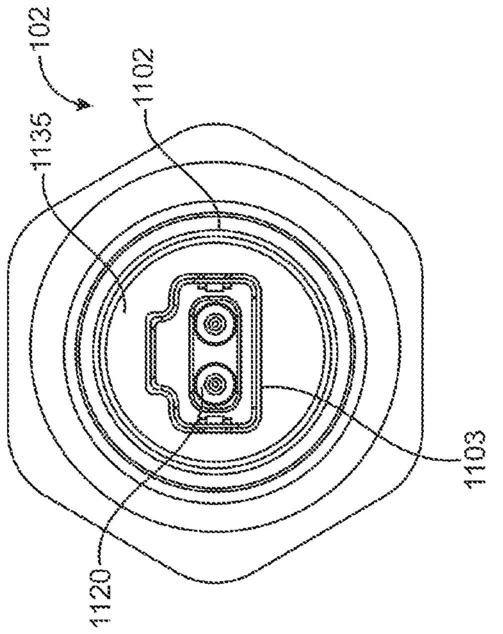
FIGS. 11B and 11C are end views of a female connector of the SPE connector in accordance with various illustrative embodiments.
Figure 11B:
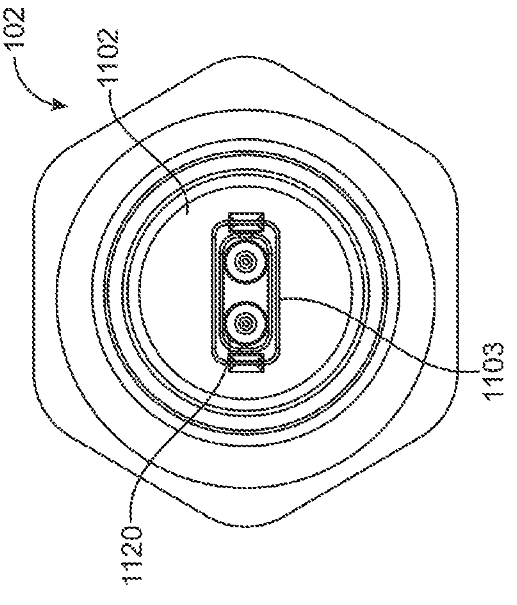

As shown in FIG. 11B, the contact shell 1103 of the female connector 102 may be structured to have a shape that is generally complementary to a shape of the extended portion 1120. In particular, the cage-like structure 1130 may be have a rounded rectangular shape. In other embodiments, the cage-like structure 1130 may have an ellipsoid shape. In other embodiments, such as the embodiment shown in FIG. 11C, the contact shell 1103 may be structured to have one or more support or retention features, which are configured to facilitate secure coupling between the female connector 102 and the male connector 103.

In some embodiments, the female connector 102 may also include a contoured gasket 1135, which is configured to have a shape generally complementary to the contact shell 1103 and is also configured to facilitate a seal between the female connector 102 and a coupled respective male connector 103. The gasket 1135 may be generally disc shaped and disposed to contact or rest upon an upper surface of the inner female housing 1102. The gasket 1135 may include a generally central aperture, which is configured to receive or conform to an outer shape of the contact shell 1103.

Figure 11D:
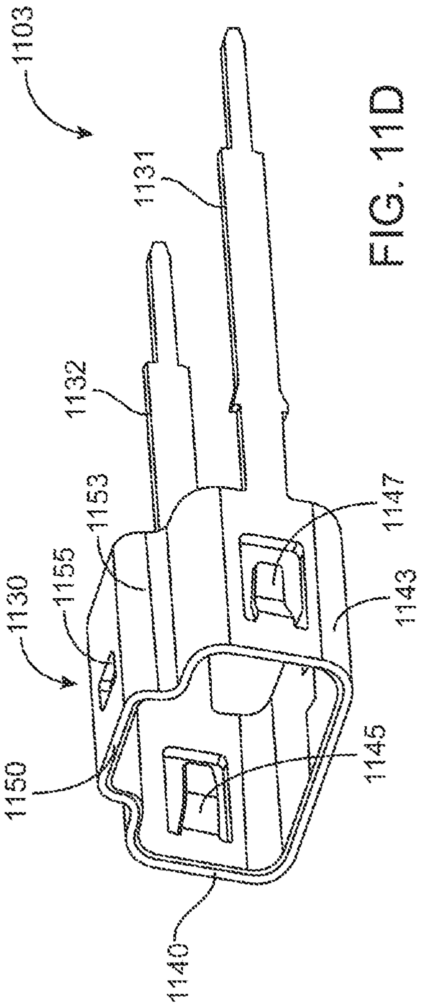
FIG. 11D is a perspective view of an inner shell within a female connector of the SPE connector in accordance with an illustrative embodiment.

FIG. 11D shows a perspective view of the contact shell 1103, according to an exemplary embodiment. As shown, the contact shell 1103 may be structured to include two opposing walls 1140 and 1147, which may be generally parallel to each other. Each of the walls 1140 and 1143 may respectively include at least one retention feature 1145 and 1147, which may extend into an interior of the cage-like structure 1130 to facilitate coupling and/or retention of the male connector 103 with the female connector 102. In various embodiments, the retention features 1145 and 1147 may be configured as cantilevered tabs and contoured to facilitate ease of coupling between the male connector 103 and the female connector 102. The cage-like structure 1130 may also include a contoured upper wall 1150 disposed between the walls 1140 and 1143, where the wall 1150 is configured to increase stability and ease of insertion of the male connector 103 within the female connector 102. As shown in FIG. 11D, the contoured wall 1150 may define a ridge 1153, which extends along a length of the cage-like structure 1130 in a direction parallel to each of the walls 1140, 1143. The ridge 1153 may include at least one aperture or recess 1155 disposed therein or therethrough, where the at least one aperture or recess 1155 is configured to facilitate retention of one or more components of the male connector 102.

Figure 12A:
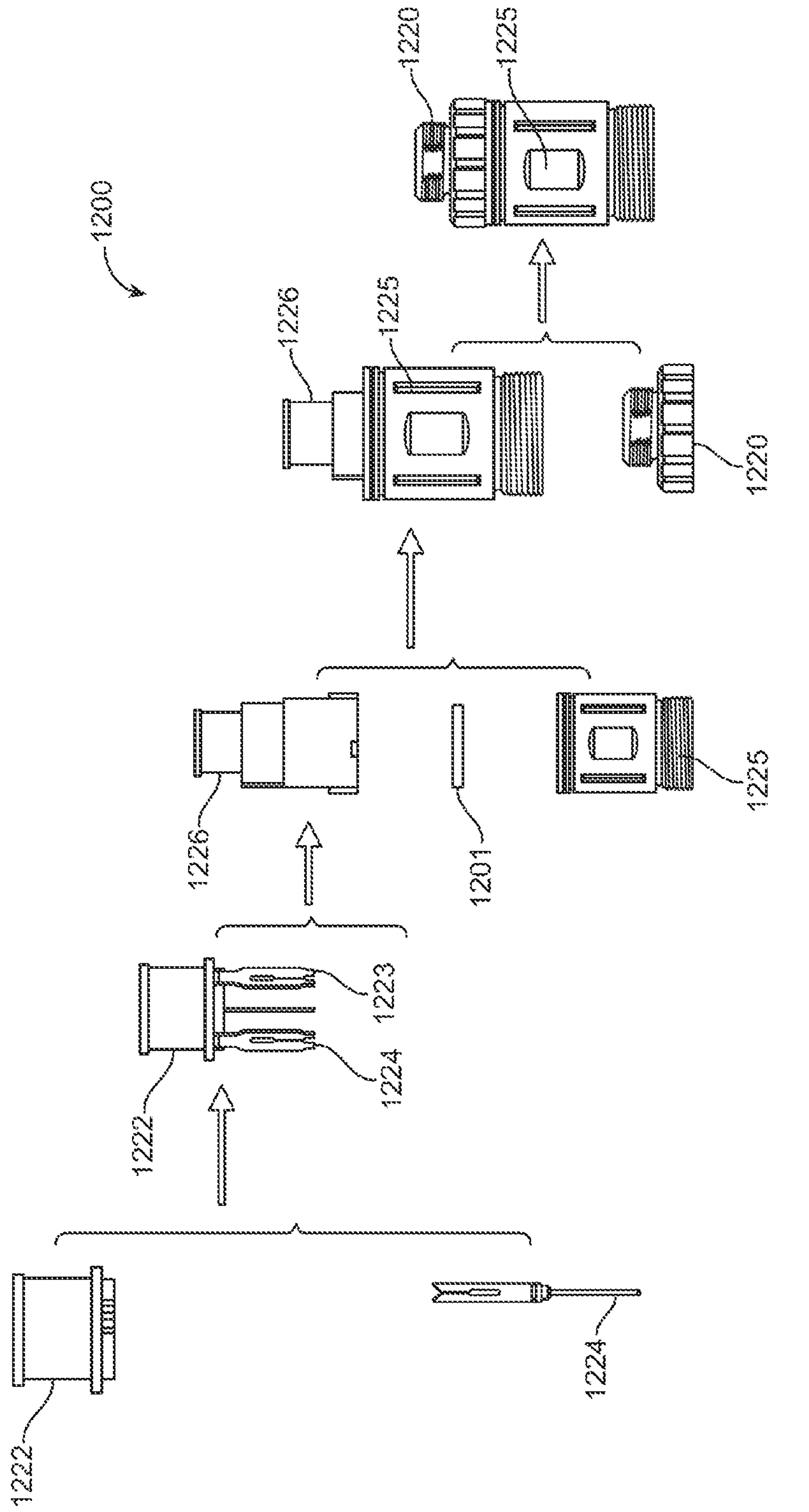
FIGS. 12A and 12B are assembly views of a second example of a male connector in accordance with illustrative embodiments.
Figure 12B:
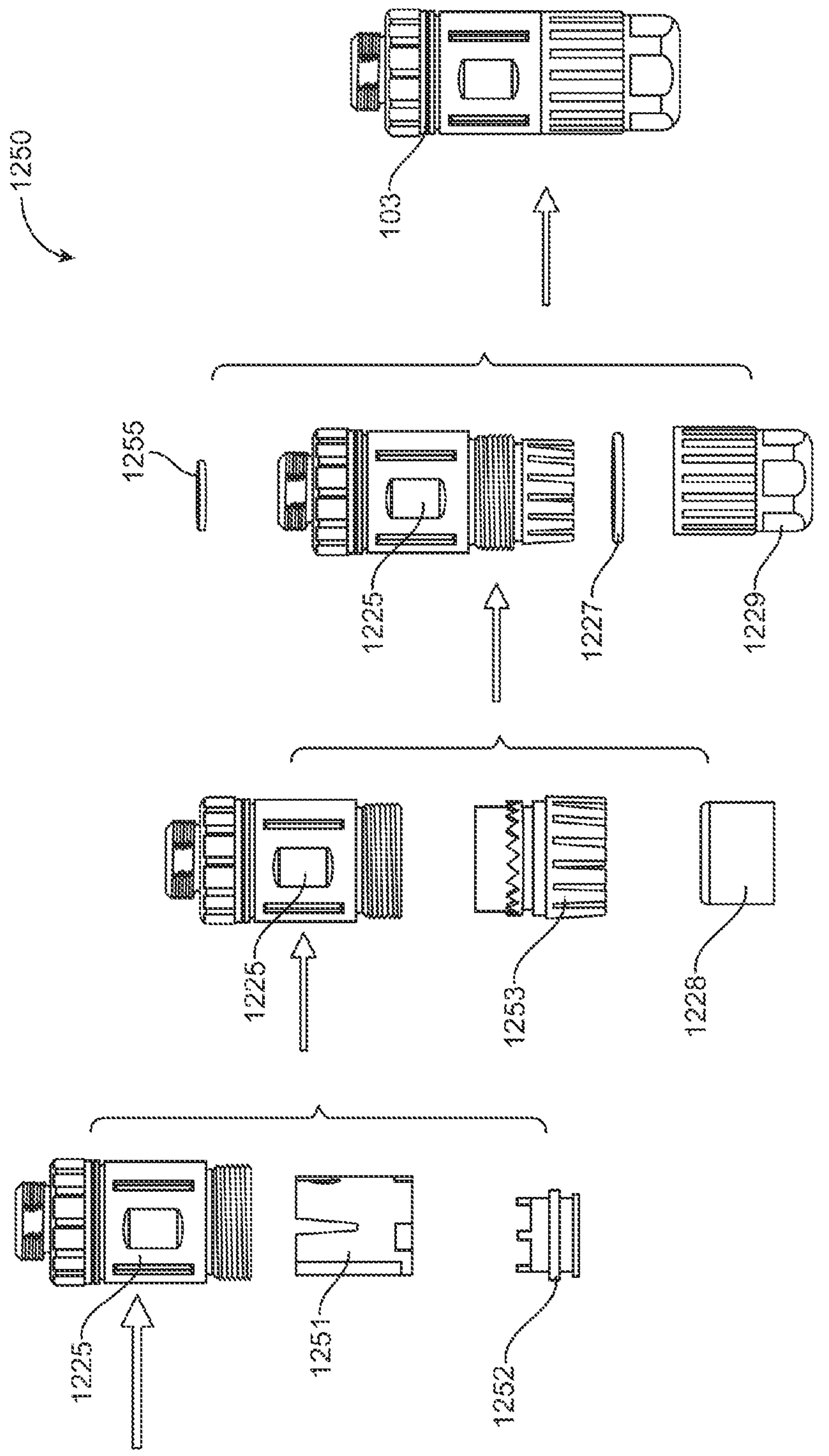

FIGS. 12A and 12B are assembly views 1200 and 1250 of a second example of a male connector 103 in accordance with illustrative embodiments. In this embodiment, the male connector 103 includes the front nut 1220 (e.g., similar to front nut 220), a first male gasket 1201 (e.g., similar to the first male gasket 501), a first inner housing 1222, a first male contact 1224 (e.g., similar to first male contact 224), a second male contact 1223 (e.g., similar to second male contact 223), a first outer housing 1225, a second inner housing 1226, a second male gasket 1227, a cable seal 1228 (e.g., similar to cable seal 228), and a pressure nut 1229 (e.g., similar to pressure nut 229).

Referring generally now to FIG. 12A, the first inner housing 1222 includes recesses on an outer wall that are configured to receive at least a portion of the first and second male contact tines 1224 and 1223. The first inner housing 1222 is structured to be positioned within the second inner housing 1226. The second inner housing 1226 is structured to be positioned within the first outer housing 1225 having the first male gasket 1201 positioned therebetween. The top nut 1220 is structured to fasten (e.g., via threads) to the first outer housing 1225 over the second inner housing 1226 thereby securing the second inner housing 1226 therebetween.

Referring generally now to FIG. 12B, a cable housing 1251 is structured to be positioned within the first outer housing 1225 on a side opposite from the top nut 1220 and a ground ring 1252 is structured to be adjoined with the cable housing 1251 on a side opposite from which that was inserted into the first outer housing. In an embodiment, the cable housing 1251 is similar to the wire retention portion of the second inner housing 1226 described in reference to FIG. 2. A cable retention housing 1252 is structured to be placed over the ground ring 1252 and positioned adjacent to the cable housing 1241. The cable retention housing 1252 is structured similar to the cable retention portion of the second inner housing 226 described in reference to FIG. 2. For example, the second inner housing 1226 in FIGS. 12A and 12B includes multiple components that improve the efficiency of assembly and reduce stress on the cable when a SPE cable is being fastened to the male connector 103 and reduce the potential for the SPE cable stress to pull on the wires fastened within the male connector 103. The cable seal 1228, second male gasket 1227, and the pressure nut 1229 are all adjoined with the first outer housing 1225 thereby securing the contacts with respective wires similar to as described above. A third male gasket 1255 may be positioned over an outward-facing portion of the top nut thereby ensuring a seal between the male connector 103 and a respective female connector 102.

Figure 12C:
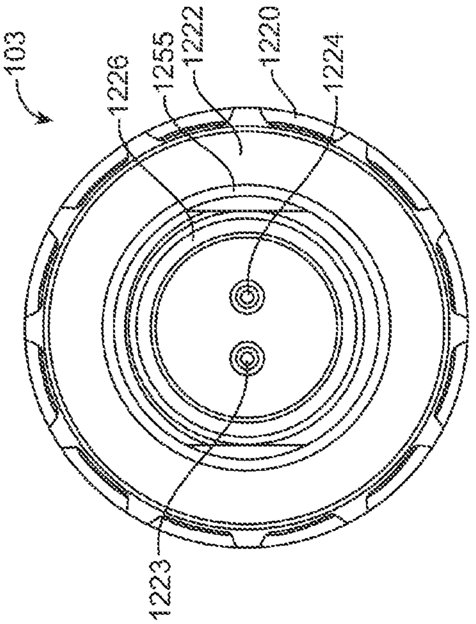
FIGS. 12C and 12D are end views of a male connector of the SPE connector in accordance with various illustrative embodiments.
Figure 12D:
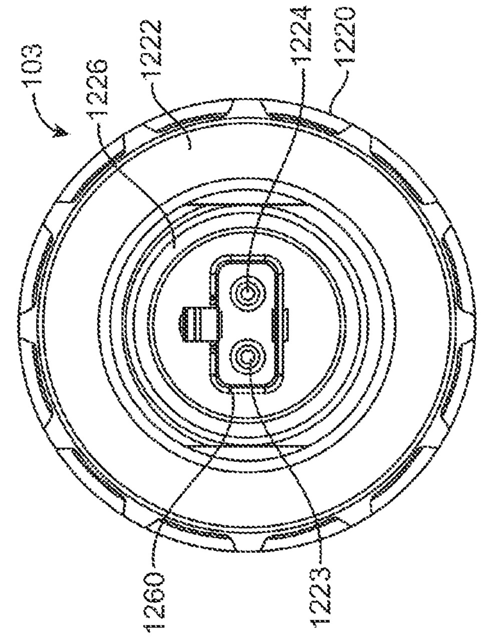

FIGS. 12C and 12D show end views of the male connector 103, according to various exemplary embodiments. As shown in FIG. 12C, the male connector 103 is configured such that the front nut 1220, the first inner housing 1222, and the second inner housing 1226 are configured to engage or interface with mating surfaces of a respective coupled female connector 102. In various embodiments, such as the embodiment shown in FIG. 12D, the male connector 103 may include an inner shell 1260, which is structured to enclose a portion of the first and second male contacts 1223, 1224 and which may be receivable within the contact shell 1103 of the female connector 102.

Figure 12E:
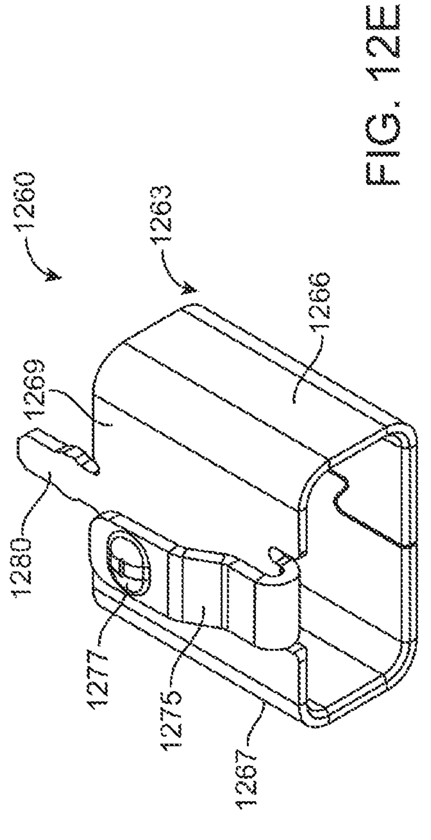
FIG. 12E is a perspective view of an inner shell within a male connector of the SPE connector in accordance with an illustrative embodiment.

As illustrated in FIG. 12E, the inner shell 1260 of the male connector 103 may include a cage-like structure ("body") 1263 having a generally rounded rectangular shape. The body 1263 includes two opposing parallel side walls 1266 and 1267. On at least one connecting wall 1269 coupled between the side walls 1266 and 1267, the inner shell 1260 may include one or more features to facilitate retention of the male connector 103 within a respective coupled female connector 102. As shown in FIG. 12E, the wall 1269 may include a cantilevered tab 1275, which is anchored (e.g., coupled to, integrally formed with) an end of the body 1263 and extends away from the body 1263. The tab 1275 may be configured to elastically deform such that the tab 1275 may compress toward the body 1263 upon insertion of the male connector 103 within the female connector 102 to form a friction or interference fit. In various embodiments, the tab 1275 may be received within the ridge 1153 of the contact shell 1103 of the female connector 102. The tab 1275 may include one or more ridges or protrusions 1277 disposed at or near a terminal end of the tab 1275 on a surface of the tab 1275 facing away from the body 1263. Accordingly, when the male and female connectors 103, 102 are coupled together, the ridge 1277 may be received within the at least one aperture or recess 1155 of the ridge 1153 to prevent separation or dislodgement. In various embodiments, the inner shell 1260 may be coupled to the second inner housing 1226. As shown, the inner shell 1260 may include a post 1280 extending from the body 1263 at an end opposite the tab 1275, where the post 1280 is configured to be received (i.e., via press fit, friction fit, interference fit, etc.) within a portion of the second inner housing 1280, which is oriented toward a mating interface between the male and female connectors 103, 102.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.) It will be further understood by those skilled in the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.) In instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.) It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A single pair Ethernet (SPE) connector comprising:
- a female connector portion comprising:
  - a first electrical contact comprising a first contact tine and a first receiving portion, the first electrical contact positioned partially within a first insulative housing;
  - a second electrical contact comprising a second contact tine and a second receiving portion, the second electrical contact positioned partially within the first insulative housing; and
  - a first outer housing, the first outer housing mechanically secured to the first insulative housing; and
- a male connector portion structured to be selectively coupled to the female connector portion, the male connector portion comprising:
  - a third electrical contact comprising a first insulation displacement contact (IDC) portion and a third contact tine;
  - a fourth electrical contact comprising a second IDC portion and a fourth contact tine; and
- a second inner housing comprising:
  - a first wire retention groove on a first side of the second inner housing;
  - a second wire retention groove on a second side the second inner housing; and
- an opening extending a length of the second inner housing.

2. The SPE connector of claim 1, the second inner housing further comprising:
- a first slot intersecting the first wire retention groove, the first slot structured to receive the first IDC portion; and a second slot intersecting the second wire retention groove, the first slot structured to receive the second IDC portion.

3. The SPE connector of claim 1, wherein a portion of the first contact tine extends from the first insulative housing parallel to a portion of the second contact tine that extends from the first insulative housing.

4. The SPE connector of claim 1, wherein the first insulative housing comprises a buffer portion that extends outward to a diameter greater than or equal to a diameter of the outer shield on a first side of the outer housing.

5. The SPE connector of claim 1, wherein the opening is structured to allow an SPE cable to extend through the second inner housing, the first wire retention groove is structured to retain a first wire of the SPE cable extending perpendicular to a direction in which the opening extends, and the second wire retention groove is structured to retain a second wire of the SPE cable extending perpendicular to the direction in which the opening extends.

6. The SPE connector of claim 1, the male connector further comprising a first inner housing, wherein the third electrical contact and the fourth electrical contact are at least partially disposed within the first inner housing.

7. The SPE connector of claim 1, the second inner housing further comprising multiple fingers extending from an opposite side of the first wire retention groove, the multiple fingers forming a cage-like structure.

8. The SPE connector of claim 7, the male connector further comprising a cable seal disposed at least partially within the cage-like structure.

9. The SPE connector of claim 8, the male connector further comprising an outer housing and a pressure nut threaded together to mechanically secure the second inner housing therein.

10. The SPE connector of claim 9, the pressure nut having a tapered portion in contact with the multiple fingers to compress the multiple fingers toward a centerline axis.

11. The SPE connector of claim 1, the male connector structured to be mechanically connected via threads on the male connector and threads on the female connector.

12. The SPE connector of claim 1, wherein the first wire retention groove and the second wire retention groove are located on an edge of the second inner housing, and wherein the first wire retention groove and the second wire retention groove included beveled edges structured to create a frictional force with respective wires.

13. The SPE connector of claim 1, wherein the first insulative housing comprises a retention spine and the first outer housing comprises a retention rib, the retention spine and the retention rib structured to mechanically connect the first insulative housing and the first outer housing.

14. The SPE connector of claim 13, wherein the retention spine and the retention rib are structured to allow for the first outer housing to rotationally move about the first insulative housing.

15. A single pair Ethernet (SPE) connector comprising:

a female connector portion comprising:

a first contact comprising a first contact tine and a first receiving portion, a second contact comprising a second contact tine and a second receiving portion, and a first insulative housing comprising a first contact retention recess and a second contact retention recess;

the first contact positioned at least partially within the first contact retention recess, and the second contact positioned at least partially within the second contact retention recess;

wherein the first contact tine and the second contact tine extend from the first insulative housing and are configured to electrically and mechanically connect to respective openings of an electrical component; and wherein each of the first receiving portion and the second receiving portion are hollow and include a tapered edge; and a male connector portion structured to be selectively coupled to the female connector portion, the male connector portion comprising:

a first insulation displacement contact (IDC);

a second IDC contact; and a second inner housing comprising a first slot intersecting a first wire retention groove and structured to receive blades from the first IDC contact and a second slot intersecting a second wire retention groove structured to receive blades from the second IDC contact.

16. The SPE connector of claim 15, the male connector portion configured to be connected to the female connector portion.

17. The SPE connector of claim 16, wherein the first contact is configured to connect with the first IDC, and wherein the second contact is configured to connect with the second IDC.

18. The SPE connector of claim 15, the female connector portion further comprising an outer shield mechanically secured to the first insulative housing, the outer shield comprising threading configured to mechanically secure to threading on the male connector portion.

19. The SPE connector of claim 15, the first IDC comprising a contact tine extending along a first plane, a transition portion connected to the contact tine at a proximal end, the transition portion extending along a second plane that is perpendicular to first plane, and an IDC portion extending from a distal end of the transition portion along a third plane that is parallel to the first plane.

20. A method comprising:

extending an SPE cable through a second inner housing;

positioning a first wire of the SPE cable within a first wire retention groove of the second inner housing and a second wire of the SPE cable within a second wire retention groove of the second inner housing;

compressing a first housing onto the second inner housing such that a first electrical connection is made between the first wire and a first IDC contact and a second electrical connection is made between the second wire and a second IDC;

adjoining an outer housing and a pressure nut together over the first housing and the second inner housing such that the first housing and the second inner housing are mechanically secured within the outer housing and the pressure nut; and adjoining the outer housing to a female connector such that the first IDC contact mechanically and electrically connects to a first female contact and the second IDC contact mechanically and electrically connects to a second female contact.

* * * * *